(12) United States Patent
Aimone et al.

(10) Patent No.: US 10,445,065 B2
(45) Date of Patent: Oct. 15, 2019

(54) CONSTANT DEPTH, NEAR CONSTANT DEPTH, AND SUBCUBIC SIZE THRESHOLD CIRCUITS FOR LINEAR ALGEBRAIC CALCULATIONS

(71) Applicant: National Technology & Engineering Solutions of Sandia, LLC, Albuquerque, NM (US)

(72) Inventors: James Bradley Aimone, Albuquerque, NM (US); Ojas D. Parekh, Albuquerque, NM (US); Cynthia A. Phillips, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 147 days.

(21) Appl. No.: 15/699,077

(22) Filed: Sep. 8, 2017

(65) Prior Publication Data
US 2019/0079729 A1    Mar. 14, 2019

(51) Int. Cl.
| | |
|---|---|
| *G06F 7/483* | (2006.01) |
| *G06F 7/487* | (2006.01) |
| *G06F 17/16* | (2006.01) |
| *G06F 17/12* | (2006.01) |
| *G06N 3/063* | (2006.01) |

(52) U.S. Cl.
CPC .......... *G06F 7/4833* (2013.01); *G06F 7/4876* (2013.01); *G06F 17/12* (2013.01); *G06F 17/16* (2013.01); *G06F 2207/4822* (2013.01); *G06F 2207/4835* (2013.01); *G06N 3/0635* (2013.01)

(58) Field of Classification Search
CPC .......... G06F 7/4876; G06F 17/12; G06F 17/16

USPC .................................................. 708/208, 446
See application file for complete search history.

(56) References Cited

U.S. PATENT DOCUMENTS

| | | | | |
|---|---|---|---|---|
| 2004/0071363 A1* | 4/2004 | Kouri | ................ | G06K 9/00516 382/276 |
| 2005/0222825 A1* | 10/2005 | Feldmann | ............... | G06F 17/12 703/2 |
| 2005/0234686 A1* | 10/2005 | Cheng | .................... | G06F 17/12 703/2 |

OTHER PUBLICATIONS

Blaser, "Fast Matrix Multiplication", Theory of Computing Library Graduate Surveys, 5 (Dec. 2013), pp. 1-60.
Esser et al., "Backpropagation for Energy-Efficent Neuromorphic Computing", Advances in Neural Information Processing Systems, © 2015, pp. 1117-1125.

(Continued)

*Primary Examiner* — Tan V Mai
(74) *Attorney, Agent, or Firm* — Yee & Associates, P.C.

(57) ABSTRACT

A method of increasing an efficiency at which a plurality of threshold gates arranged as neuromorphic hardware is able to perform a linear algebraic calculation having a dominant size of N. The computer-implemented method includes using the plurality of threshold gates to perform the linear algebraic calculation in a manner that is simultaneously efficient and at a near constant depth. "Efficient" is defined as a calculation algorithm that uses fewer of the plurality of threshold gates than a naïve algorithm. The naïve algorithm is a straightforward algorithm for solving the linear algebraic calculation. "Constant depth" is defined as an algorithm that has an execution time that is independent of a size of an input to the linear algebraic calculation. The near constant depth comprises a computing depth equal to or between O(log(log(N)) and the constant depth.

20 Claims, 6 Drawing Sheets

(56) References Cited

OTHER PUBLICATIONS

Furst et al. "Parity, Circuits, and the Polynomial-Time Hierarchy", Mathematical Systems Theory, 17(Aug. 1983), pp. 13-27.
Indiveri et al., "Neuromorphic silicon neuron circuits", Frontiers in Neuroscience, vol. 5., Article 73 (May 2011), pp. 1-23.
Kane et al., "Super-Linear Gate and Super-Quadratic Wire Lower Bounds for Depth-Two and Depth-Three Threshold Circuits", arXiv:1511.07860 v1 [cs.CC], Nov. 2015, 20 pages.
Khan et al., "SpiNNaker: Mapping Neural Networks onto a Massively-Parallel Chip Multiprocessor", Proceedings of the International Joint Conference on Neural Networks, Jun. 2008, 8 pages.
Merolla et al., "A million spiking-neuron integrated circuit with a scalable communication network and interface", Science, vol. 345, Issue 6197, pp. 668-673.
Orman et al., "An Empirical Study of the Relation Between Community Structure and Transitivity", Studies in Computational Intelligence, vol. 424, © 2014, pp. 99-110.
Seshadhri et al., "Community structure and scale-free collections of Erdos-Renyi graphs", arXiv:1112.3644v1 [cs.SI] Dec. 15, 2011, Physical Review E, vol, 85, © 2012, 10 pages.
Sima et al., "General-Purpose Computation with Neural Networks: A Survey of Complexity Theoretic Results", Neural Computation, vol. 5 (Dec. 2003), pp. 2727-2778.
Williams, V.V., "Multiplying matrices in O(n2.373) time", Stanford University, Jul. 1, 2014, 73 pages.
Anonymous Author(s), "Constant Depth and sub-cubic Size Threshold Circuits for Counting Triangles in Graphs," submitted to 29th Conference on Neural Information Processing Systems (NIPS 2016).
Siu, et al., "On Optimal Depth Threshold Circuits for Multiplication and Related Problems," SIAM Journal on Discrete Mathematics, vol. 7, No. 2 (May 1994), pp. 284-292.
Siu, et al., "Depth-Size Tradeoffs for Neural Computation," IEEE Transactions on Computers, vol. 40, No. 12 (Dec. 1991), pp. 1402-1412.
Strassen, "Gaussian Elimination is not Optimal," Numerische Mathematik, 13 (Aug. 1969), pp. 354-356.
Yao, A.C.-C., "Separating the Polynomial-Time Hierarchy by Oracles," (Preliminary Version), 26th Annual Symposium on Foundations of Computer Science (Oct. 1985), pp. 1-10.
McCulloch et al., "A Logical Calculus of the Ideas Immanent in Nervous Activity," Bulletin of Mathematical Biophysics, vol. 5 (1943), pp. 115-133.

* cited by examiner $$\begin{matrix}100\\\downarrow\end{matrix}\quad\begin{matrix}102\\\downarrow\end{matrix}\quad\begin{matrix}104\\\downarrow\end{matrix}$$

$$\left[\begin{array}{c|c} A_{11} & A_{12} \\ \hline A_{21} & A_{22} \end{array}\right] \times \left[\begin{array}{c|c} B_{11} & B_{12} \\ \hline B_{21} & B_{22} \end{array}\right] = \left[\begin{array}{c|c} C_{11} & C_{12} \\ \hline C_{21} & C_{22} \end{array}\right]$$

STANDARD                                          STRASSEN

106 →
$C_{11} = A_{11}B_{11} + A_{12}B_{21}$            $M_1 = (A_{11} + A_{22})(B_{11} + B_{22})$ $C_{12} = A_{11}B_{12} + A_{12}B_{22}$            $M_2 = (A_{21} + A_{22})B_{11}$ $C_{21} = A_{21}B_{11} + A_{22}B_{21}$            $M_3 = A_{11}(B_{12} - B_{22})$ $C_{22} = A_{21}B_{12} + A_{22}B_{22}$            $M_4 = A_{22}(B_{21} - B_{11})$  ← 108

$M_5 = (A_{11} + A_{12})B_{22}$ $M_6 = (A_{21} - A_{11})(B_{11} + B_{12})$

STANDARD: 8 BLOCK MULTIPLICATIONS                 $M_7 = (A_{12} - A_{22})(B_{21} + B_{22})$
(4 BLOCK +'S)

STRASSEN: 7 BLOCK MULTIPLICATIONS                 $C_{11} = M_1 + M_4 - M_5 + M_7$
(18 BLOCK +/-'S)
$C_{11} = M_3 + M_5$ $C_{21} = M_2 + M_4$ $C_{22} = M_1 - M_2 + M_3 + M_6$

CONSTANT DEPTH, NEAR CONSTANT DEPTH, AND SUBCUBIC SIZE THRESHOLD CIRCUITS FOR LINEAR ALGEBRAIC CALCULATIONS

GOVERNMENT LICENSE RIGHTS

This invention was made with United States Government support under Contract No. DE-NA0003525 between National Technology & Engineering Solutions of Sandia, LLC and the United States Department of Energy. The United States Government has certain rights in this invention.

BACKGROUND INFORMATION

1. Field

The present disclosure relates to methods and devices for techniques for using neuromorphic hardware or spiking neural networks to perform linear algebraic calculations, such as matrix multiplication. More specifically, the present disclosure relates to methods and devices for tailoring neuromorphic or spiking neural network application specific integrated circuits (ASICs) designed to perform linear algebraic calculations, such as matrix multiplication. Thus, the present disclosure relates to constant depth, near constant depth, and sub-cubic size threshold circuits for linear algebraic calculations.

2. Background

Despite the rapid advances in computer technologies and architectures over the last seventy years, still faster or more powerful forms of computing are desired. Neural computing technologies have been one of several proposed novel architectures to either replace or complement the ubiquitous von Neumann architecture platform that has dominated conventional computing for the last seventy years.

SUMMARY

The illustrative embodiments provide for a method of increasing an efficiency at which a plurality of threshold gates arranged as neuromorphic hardware are able to perform a linear algebraic calculation having a dominant size of N. The computer-implemented method includes using the plurality of threshold gates to perform the linear algebraic calculation in a manner that is simultaneously efficient and at a near constant depth. "Efficient" is defined as a calculation algorithm that uses fewer of the plurality of threshold gates than a naïve algorithm. The naïve algorithm is a straightforward algorithm for solving the linear algebraic calculation. "Constant depth" is defined as an algorithm that has an execution time that is independent of a size of an input to the linear algebraic calculation. The near constant depth is a computing depth equal to or between $O(\log(\log(N)))$ and the constant depth.

The illustrative embodiments also provide for a neuromorphic computer. The neuromorphic computer includes a plurality of threshold gates or spiking neurons configured to compute a specific linear algebraic calculation having a dominant size of N in a manner that is simultaneously efficient and at a near constant depth. "Efficient" is defined as a calculation algorithm that uses fewer of the plurality of threshold gates than a naïve algorithm. The naïve algorithm is a straightforward algorithm for solving the specific linear algebraic calculation. "Constant depth" is defined as an algorithm that has an execution time that is independent of a size of an input to the specific linear algebraic calculation. The near constant depth is a computing depth equal to or between $O(\log(\log(N)))$ and the constant depth.

The illustrative embodiments also provide for a method of manufacturing a neuromorphic computer tailored to perform a specific linear algebraic calculation. The method includes manufacturing a plurality of threshold gates or spiking neurons. The method also includes arranging the plurality of threshold gates or spiking neurons to compute the linear algebraic calculation having a dominant size N in a manner that is simultaneously efficient and at a near constant depth. "Efficient" is defined as a calculation algorithm that uses fewer of the plurality of threshold gates than a naïve algorithm. The naïve algorithm is a straightforward algorithm for solving the linear algebraic calculation. "Constant depth" is defined as an algorithm that has an execution time that is independent of a size of an input to the linear algebraic calculation. Near constant depth is a computing depth equal to or between $O(\log(\log(N)))$ and the constant depth.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 1 illustrates matrix multiplication by a naïve, straight forward method and by an efficient method in accordance with an illustrative embodiment;

DETAILED DESCRIPTION

Figure 2:
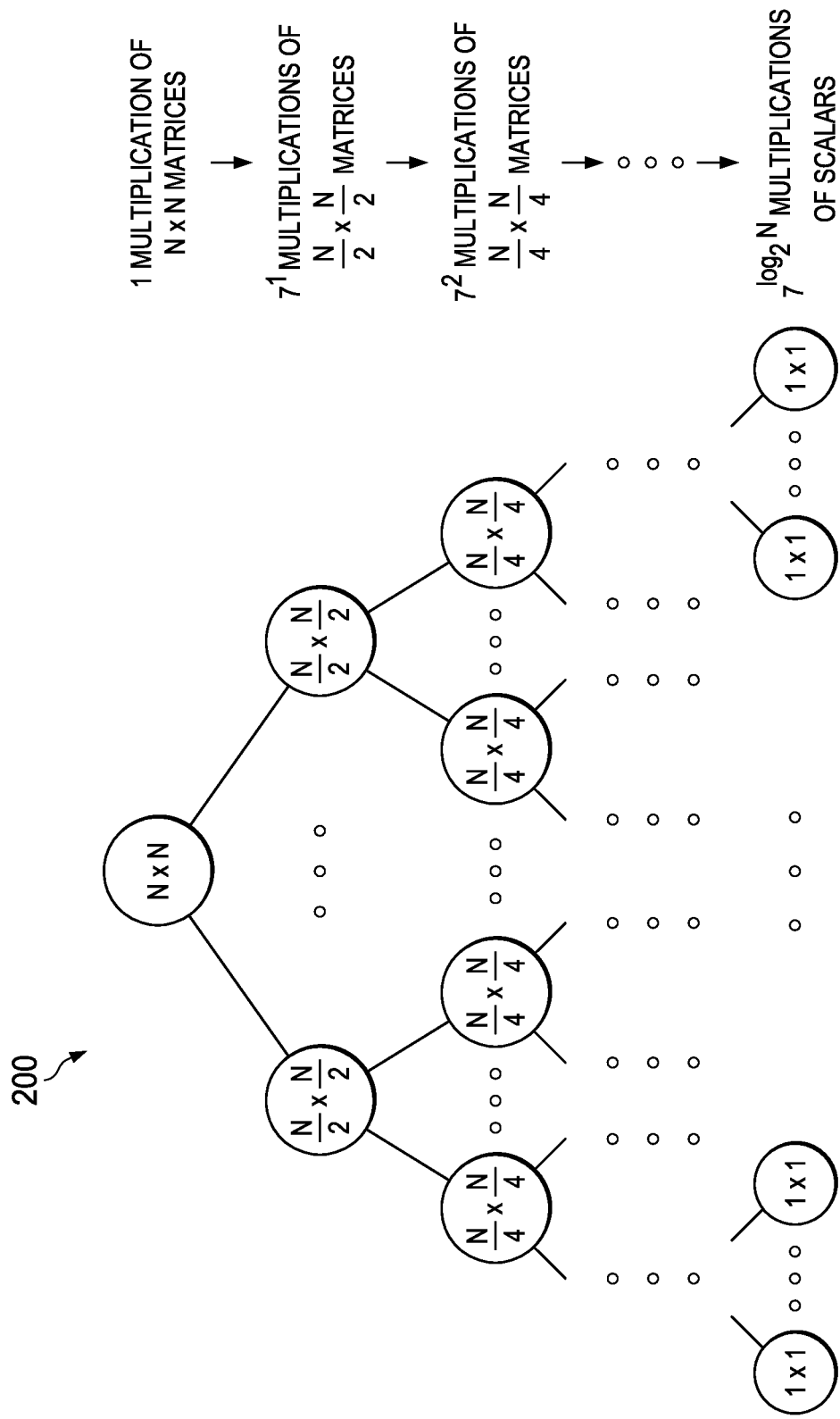
FIG. 2 illustrates the efficient method of matrix multiplication shown in FIG. 1 in accordance with an illustrative embodiment.

The illustrative embodiments recognize and take into account that, for decades, neural networks have shown promise for next-generation computing. Recent breakthroughs in machine learning techniques, such as deep neural networks, have provided state-of-the-art solutions for inference problems. However, these networks require thousands of training processes and are poorly suited for the precise computations required in scientific or similar arenas. Thus, for example, the illustrative embodiments recognize and take into account that neural networks and neuromorphic computers are poor at performing linear algebraic calculations, generally.

The illustrative embodiments also recognize and take into account that the advent of neuromorphic computing hardware has made hardware acceleration of many functions relevant to complex computing tasks possible. Thus, the illustrative embodiments describe a method to leverage neuromorphic hardware to perform non-trivial numerical computation, such as matrix multiplication or matrix inversion, at lower resource costs than a naïve implementation would provide.

As used herein, an efficient linear algebraic calculation algorithm is defined as being better than a naïve linear algebraic calculation algorithm with respect to a resource of interest. For example, a naïve implementation of matrix multiplication of two square matrices A and B (size N×N) requires $O(N^3)$ multiplication operations. As a specific example, multiplying two matrices, each of the size 3×3, would require 9 multiplication operations to solve. This naïve, or straight forward, algorithm is a straight forward multiplication of each row of matrix A with each column of matrix B.

In contrast, an efficient matrix multiplication algorithm uses fewer operations. Likewise, as used herein, an efficient linear algebraic calculation algorithm leverages a non-obvious technique, such as described by Strassen, to perform $O(N^{2+\delta})$ operations, where $\delta$ is a number equal to or greater than zero, but less than one. These terms are distinguished from an efficient neuromorphic algorithm, below, though an efficient matrix multiplication algorithm or an efficient linear algebraic calculation algorithm should also be an efficient neuromorphic algorithm. Continuing with the topic of efficient matrix multiplication algorithms, an example of such an algorithm is the Strassen method. In the Strassen method, $\delta \approx 0.81$. Subsequent improvements upon Strassen's approach have resulted in an efficient algorithm with $\delta \approx 0.37$ for matrix multiplication, and it is a major open problem in computer science whether an algorithm with $\delta = 0$ exists. Although Strassen's multiplication algorithm was designed as a serial algorithm, it can be implemented as an iterative parallel algorithm with a depth (number of steps necessary to compute it) of $O(\log(N))$. The total amount of work the parallel algorithms performs, as measured by the number of arithmetic operations, is $O(N^{2+\delta})$.

As used herein, a constant depth algorithm has an execution time (that is, a number of steps necessary if unlimited parallel processors are available) that does not depend on the size of the input, which is N in the case above. In other words, an algorithm that has a depth of 6 will require 6 steps to compute, regardless of whether the input size N is equal to 10 or 1,000,000. Such algorithms exhibit perfect parallelism, in that the work the algorithm performs can be distributed across many parallel processors with only a constant sized overhead in combining the processing steps. Constant depth parallel algorithms are rare in most practical parallel computing models. The barrier to constant depth algorithms is that, even though work may be distributed across an unlimited number of processors, there is an inherent dependency in a sequence of computational steps; inputs of one step may depend on outputs of others. A perfectly parallel algorithm is able to select and organize its steps so that only a constant number are necessary.

As used herein a "threshold gate" is a computational device comparable to a neuron on a neuromorphic computing platform. Threshold gates are typically Boolean functions (outputting a 1 or a 0). A Boolean threshold gate with m binary inputs y1, y2, y3, . . . ym computes a linear threshold function, outputting 1 if and only if $\Sigma_{i=1}^{m} w_i y_i \geq t$, where the integer weights $w_i$ and integer threshold t are constants associated with the gate. Threshold gates are different from conventional simple logic gates like AND and NOT in that they can have an unbounded number of inputs instead of 2 inputs, and they compare against a tunable threshold as opposed to checking that all inputs are the same or different.

As used herein, the term "neuromorphic hardware" is hardware specialized to perform computation on threshold gates. Neuromorphic hardware may be viewed as a model of parallel computation, where the amount of work performed by an algorithm is the total number of gates required to implement it. Efficiency in the context of neuromorphic algorithms is an "efficient neuromorphic algorithm." Efficiency in this context refers to the number of gates employed. If a given computation in neuromorphic hardware can be performed by two different algorithms, the algorithm that uses the fewest threshold gates to perform the computation is considered the most efficient. The fewer the gates employed to perform a computation, the more efficient. The depth of a neuromorphic algorithm is, as above, the number of steps required to obtain the output.

Attention is now turned to challenges in designing neuromorphic hardware. In particular, for neuromorphic hardware to be well suited to perform linear algebra, we require efficient implementations be found that are a constant depth when implemented in a threshold gate formulation. The illustrative embodiments describe a method to achieve all of these characteristics simultaneously.

The illustrative embodiments also recognize and take into account another challenge in designing neuromorphic hardware. In particular, achieving either efficient or constant depth implementations of matrix multiplication on neuromorphic hardware is not simple. However, these are relatively straight forward or naïve exercises. For example, a naïve binary matrix multiplication algorithm can be formulated as a simple depth-2 threshold gate circuit. This example is provided below with respect to FIG. 1.

However, achieving both efficiency and constant depth is a challenge for the following reasons. First, efficient methods that leverage iterative approaches, such as Strassen, must be converted into a constant depth network. This challenge was not previously recognized. For example, Strassen's iterative algorithm computes seven products for two 2×2 matrices, and then computes the output matrix by taking different linear combinations of these products. This process is then repeated for progressively larger blocks of the original data until the final product is obtained. That is, the entries of the next layer's two input matrices are the outputs of the first set of computations. This process requires $O(\log(N))$ depth, and must be converted to a constant depth. It is difficult to do so while retaining the efficiency of the original approach.

The illustrative embodiments recognize another challenge to performing linear algebraic computations using neuromorphic hardware. Threshold gates perform weighted addition and compare the information to a threshold, however matrix multiplication algorithms require general arithmetic computations of sums and products. As described above, these efficient algorithms for tasks, such as matrix multiplication, require separate stages of computing involving additions and subtractions and involving computing products. These intermediate sums and products can vary in their precision depending on the location within the algorithm. While threshold gates do compute weighted sums in their internal computation, they are not general purpose devices. Therefore, special circuits must be constructed to perform addition and subtraction of two numbers and multiplication of two numbers. Accordingly, required precision for the computation amplifies through any circuit, requiring more sophisticated threshold gate structures to maintain efficiency.

Regardless of whether inputs utilize Boolean representations or not, intermediate stages in the computation have to be able to represent numbers with potentially amplifying precision. For example, the sum of K 1-bit numbers requires O(log(K)) precision to represent. This principle is particularly true for the case of complex sums and products being used in the efficient algorithms considered here. Thus, multiple threshold gates are required to communicate non-binary numbers of growing precision to subsequent stages of the algorithm. Performing this function while maintaining overall efficiency of the algorithm is non-trivial.

The illustrative embodiments successfully address these challenges. Section 3.3, below, works out the math for converting efficient methods that leverage iterative approaches into a constant depth network, for the particular case of matrix-matrix multiplication of two N×N matrices with the precision of O(log(N)) bits for each entry. This example illustrates that our method can achieve a constant depth with only a small penalty on efficiency, see Theorem 8 below, or get arbitrarily close to a constant depth with a comparable efficiency to state-of-the-art non-neural formulations, see Theorem 7, below.

In addition, section 3.2, below, describes the basic arithmetic blocks used as pieces of an overall inventive method. Some of these pieces were optimized for the purposes of the illustrative embodiments, such as Lemma 2, and Corollary 3, below. This technique is non-trivial.

Still further, the discussion in section 3.2 describes considerations around precision and maintaining the constant depth and resource requirements, particularly when dealing with negative numbers. Thus, the illustrative embodiments provide for constant depth, near constant depth, and sub-cubic size threshold circuits for linear algebraic calculations.

FIG. 1 illustrates matrix multiplication by a naïve, straightforward method and by an efficient method, in accordance with an illustrative embodiment. In particular, FIG. 1 illustrates the multiplication of two matrices, matrix A 100 times matrix B 102. This multiplication is an example of a linear algebraic calculation. The result is matrix C 104.

Matrix A 100, matrix B 102, and matrix C 104 are all two by two matrices. Thus, each of these matrices can be described as being of "order 2". Similarly, each of these matrixes can be described as N×N matrices, where N=2.

Multiplying matrix A 100 and matrix B 102 can be done by a straight forward method, also known as a naïve method, a brute force method, or a standard method. The standard method is shown in column A 106 of FIG. 1. In this method, the value for each cell in matrix C 104 is computed as shown. For example, the value of cell $C_{11}$ is equal to the sum of two products; namely: $C_{11}$ equals ($A_{11}$ times $B_{11}$) plus ($A_{12}$ times $B_{21}$).

Thus, the value of $C_{11}$ requires performing two multiplications. Calculating the value of the other three cells of matrix C 104 requires six more multiplications. Accordingly, the standard algorithm for finding the solution to multiplying two matrixes, that are each two by two, requires eight multiplications.

More generally, multiplying two matrices of size N requires $N^3$ multiplication operations using the straight forward method. For the above example in FIG. 1, where N=2, the value of $2^3=8$, matches the number of multiplication calculations determined more deliberately. However, if the value of N is one million, such as for a potential real scientific calculation, then the number of multiplications required to solve for matrix C 104 is $1,000,000^3=10^{18}=1$ quintillion. One quintillion is equivalent to a million times a trillion. Thus, the desirability of any increase in the efficiency of multiplying matrices becomes immediately apparent.

Such techniques exist. For example, the Strassen method of matrix multiplication is shown in column B 108. In the Strassen method, seven block multiplications are performed, instead of 8. Thus, for a two by two matrix only, one less multiplication step is required to solve for matrix C 104. More detail regarding the Strassen method, and generalizations of efficient methods of matrix multiplication, are given below.

As indicated above, FIG. 1 represents an extremely simple case. In practical scientific computing examples, the value of N for a matrix may be 1,000, may be 1,000,000, or may be even higher. Thus, even what may appear to a lay person to be small gains in efficiency of performing desired matrix multiplications can be significant. Additional details regarding FIG. 1 are provided below.

FIG. 2 illustrates the efficient method of matrix multiplication shown in FIG. 1, in accordance with an illustrative embodiment. In particular, tree 200 shows the Strassen method, in column B 108 of FIG. 1, in pictorial form. In this pictorial form, tree 200 shows that multiplication of N×N matrices requires N multiplications of N/2×N/2 matrices, $N^2$ multiplications of N/4×N/4 matrices, and most generally $7^{log(2)N}$ multiplications of scalars.

The r-ary tree $T_A$ for Strassen's Algorithm (r=7, T=2). For K×K matrices U and V, the notation Uij or (U)ij refers to the (i, j)th K/T×K/T block of U; observe that (U+V)ij=Uij+Vij. Each node children corresponding to the r multiplication expressions Mi. An edge associated with Mi is labeled with the number of terms of A that appear in Mi. Each node u on level h corresponds to a matrix that is a weighted sum of $N/T^h \times N/T^h$ blocks of A. The number of blocks of A appearing in such a sum is the product of the edge labels on the path from u to the root of the tree. For example, (A12−A22)12−(A12−A22)22=(A12)12−(A22)12−(A12)22+(A22)22 is a weighted sum of 4 $N/T^2 \times N/T^2$ blocks of A. The $N^{log_T r}$ leaves of $T_A$ correspond to scalars that are weighted sums of entries of A.

Figure 3:
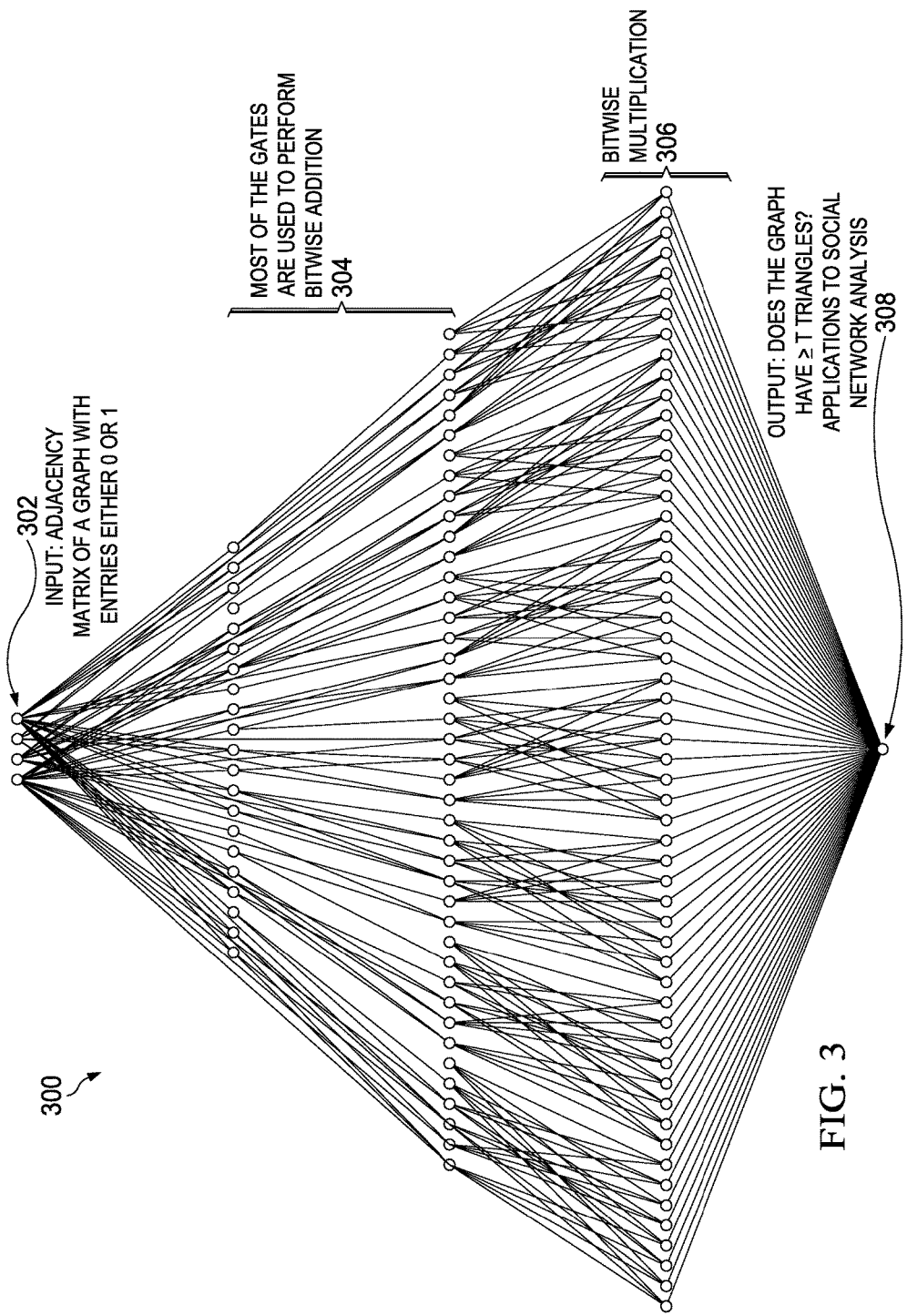
FIG. 3 illustrates counting triangles in a graph G having an input adjacency matrix in accordance with an illustrative embodiment.

FIG. 3 illustrates counting triangles in a graph G having an input adjacency matrix, in accordance with an illustrative embodiment. Graph 300 is an example of a general graph, graph G, in which the object is to count the number of triangles present in graph G. Graph 300 represents the kind of real-life scientific computing exercise that may be desirable. In particular, graph 300 might represent performing a calculation to find relationships in a social network, though other applications are possible. The solution to counting triangles in graph G relies on the multiplication of large matrices, which is a linear algebraic calculation.

As shown in FIG. 3, input 302 of graph G is an adjacency matrix of a graph with entries of either 0 or 1 in the cells of the matrix. As shown at area 304, most of the threshold gates in a neural network performing the required calculations are used to perform bitwise addition. However, many gates are also used to perform bitwise multiplication, as shown at area 306. Output 308 is an answer to the question whether graph 300 has more than or equal to T triangles, where T represents a predetermined threshold. As indicated above, output 308 has applications in social network analysis. Additional details regarding FIG. 3 are provided below.

Attention is now turned to a more scientific and mathematical approach to the issues and solutions described above. As a broad overview, we begin with the observation that Boolean circuits of McCulloch-Pitts nodes are a classic model of neural computation studied heavily in the late 20th century as a model of general computation. Recent advances in largescale neural computing hardware has made their practical implementation a near-term possibility.

The illustrative embodiments describe a theoretical approach for performing matrix multiplication using constant depth threshold gate circuits that integrates threshold gate logic with conventional fast matrix multiplication approaches that perform $O(N^{3-\in})$ arithmetic operations for constant $\in >0$. Dense matrix multiplication is a core operation in convolutional neural network training. Performing this work on a neural architecture instead of off-loading it to a general processing unit may be an appealing option. Prior to the illustrative embodiments, it was not known whether the $\Theta(N^3)$-gate barrier was surmountable.

The illustrative embodiments describe the computational power of Boolean circuits where the fundamental gates have unbounded fan-in and compute a linear threshold function. Such circuits are rooted in the classical McCulloch-Pitts neuronal model, with linear threshold functions serving as plausible models of spiking neurons. A Boolean threshold gate with m binary inputs $y_1, y_2, \ldots, y_m$ computes a linear threshold function, outputting 1 if and only if $\Sigma_{i=1}^{m} w_i y_i \geq t$ where the integer weights $w_i$ and integer threshold t are constants associated with the gate. Rational $w_i$ and t may be represented, for example, by multiplying $w_i$ and t with a common denominator. There are several natural measures of complexity associated with Boolean circuits, including size: the total number of gates, depth: the length of the longest directed path from an input node to an output node, edges: the total number of connections between gates, and fan-in: the maximum number of inputs to any gate.

Consider threshold circuits with a constant depth and polynomial size with respect to the total number of inputs. This class of circuits is called $TC^0$. Such circuits represent a plausible model of constant-time parallel computing. This is a notion of perfect parallelizability, faster than the polylogarithmic time allowed in the complexity class NC. $TC^0$ circuits can compute a variety of functions including integer arithmetic, sorting, and matrix multiplication. In contrast, constant depth and polynomial size circuits with unbounded fan-in, including other types of natural gates such as AND, OR, and NOT gates cannot compute functions such as the parity of n bits, which can be computed by $TC^0$ circuit of sublinear size. Understanding the power and limitations of $TC^0$ circuits has been a major research challenge over the last couple of decades. The 1990's saw a flurry of results showing what $TC^0$ circuits could do, while more recent results have focused on lower bounds showing what $TC^0$ circuits cannot do.

$TC^0$ has been studied as a theoretical model. Its practicality is an open question. Currently, large-scale electronic circuits with high fan-in may be difficult to implement, however neural-inspired architectures may offer hope. The adult human brain contains about 100 billion neurons, with maximum fan-in of about 10,000 in the cortex and larger in the cerebellum. Though impressive, this figure represents a single class of instance size, so one might wonder how a synthetic system based on the physical limitations governing a brain might scale asymptotically. We are not aware of any generative brain models for which this has been analyzed, however a fan-in that grows with the total system size seems plausible for a 3D circuit, such as the brain. Even if allowing unbounded fan-in, neuron resource requirements may grow as a function of fan-in. For example, there may be growth in energy or time due to a loss in precision. Constant depth, in the $TC^0$ sense, may not equate to constant time, however such ideal algorithms may still guide the development of resource-efficient practical algorithms as neuromorphic architectures become more prevalent.

There is a renewed interest in the complexity of threshold circuits, in part because of recent developments in neural-inspired architectures. While neuromorphic computing has long had a focus on the use of analog computation to emulate neuronal dynamics, recent years have seen rapid development of novel digital complementary metal-oxide semiconductor (CMOS) neural hardware platforms which can scale to very large numbers of neurons. While the inspiration of these architectures in large part came from the desire to provide a substrate for large biologically inspired circuits, they are attracting attention as an alternative to conventional complementary metal-oxide semiconductor (CMOS) architectures for accelerating machine learning algorithms, such as deep artificial neural networks. Many of these neural architectures, such as TrueNorth and the SpiNNaker platform, achieve considerable benefits in energy and speed by using large numbers of simple digital spiking neurons instead of a relatively smaller number of powerful multi-purpose processors. These systems are almost configurable threshold gate circuits, except that they are capable of extended temporal dynamics. Scientific computing is an application domain for which neural architectures are often quickly dismissed. There is a perception that human cognition is better for data-centric functions, such as image recognition, and for abstract decision making than for precise numerical calculations, particularly at a large scale. While biologically-inspired neural algorithms are often probabilistic or approximate, the neuronal-level computations in large scale neural architectures are sufficiently precise for numerical computation.

Consider a fundamental scientific computing-inspired problem: can one produce constant depth threshold circuits that compute the product of two N×N matrices using O $(N^{3-\in})$ gates for constant $\in >0$? For matrices with relatively large entries (say $\Omega(N)$ bits), this goal seems out of reach. However, prior to this work, it was not known if this was possible even for binary matrices, those with entries that are all either 0 or 1.

The present disclosure shows how to multiply two N×N matrices with $O(\log(N))$-bit entries using $O(N^{3-\in})$ gates and constant depth. The results are based on classical breakthroughs for fast matrix multiplication: multiplying two N×N matrices using $O(N^{3-\in})$ arithmetic operations. The näive algorithm based on the definition of matrix multiplication requires $\Theta(N3)$ arithmetic operations. These techniques result in $O(\log(N))$-time conventional parallel algorithms (for architectures such as parallel random-access machine (PRAM)) with $O(N^{3-\in})$ total work. In contrast, the embodiments present a constant-time algorithm, in the threshold circuit model, with $O(N^{3-\in})$ total gates, which is a reasonable measure of total work. This procedure is the first use of fast matrix multiplication techniques on an unconventional architecture.

One motivation for neural-circuit-based matrix multiplication is convolutional neural networks for deep learning. See Warden's clear explanation of the role of matrix multiplication in convolution steps for neural networks, which is summarized here. For more details see the Stanford course notes at http://cs231n.github.io. These networks assume the input is a two-dimensional image, with an n×n grid of pixels, each with l channels. The neural networks usually refer to the number of channels as depth, but here, "depth" refers to the number of layers in our circuit. Typically, the number of channels l is a constant, but not necessarily just the three classic color channels (red, green, blue). A convolutional step applies a set of K kernels to the image. Each kernel looks for a particular sub-pattern, such as a horizontal edge or a splash of red. The kernel considers a small constant q×q submatrix of pixels (with l channels) at a time and is applied across the whole image based on a stride. This recognizes the pattern no matter where it is in the image. For example, if the stride is four, then the kernel is applied to every fourth column and every fourth row. A place where the kernel is applied is called a patch. For each patch, for each kernel, a dot product scores the extent to which the patch matches the kernel. Computing all of the kernels simultaneously is a matrix multiplication. The first matrix is P×Q, where P=O(n2) is the number of patches and Q=q×q×l is the number of elements in a kernel. The second matrix is Q×K. This gives a P×K output matrix, giving the score for each patch for each kernel.

Let N be the largest matrix dimension and may use a fast matrix multiplication algorithm that can multiply two N×N matrices in time $O(N^\omega)$. The circuit requires fan-in as large as $O(N^\omega)$. These are gates at the end that compute the final output matrix entries. Two of the relevant matrix dimensions for convolutional neural networks, K and Q are generally constants. The third dimension P is not. However, if the particular architecture can only support fan in x, the matrix breaks multiplication into independent pieces, each with at most $$\sqrt[\omega]{x}$$

rows in the first matrix. These can run in parallel, so they have the same depth, given a large enough architecture. Thus, the unbounded fan-in in the algorithm is not necessarily a practical limitation for the motivating application.

Deep learning is a major motivation for neural-inspired architectures. A current vision requires the matrix multiplication to be moved off-system to a general processor unit. If circuit-based matrix multiplication can be made practical, perhaps this computation can be left on-chip.

Although our results extend to multiplying two N×N matrices with O(log(N))-bit entries, for ease of explanation, the illustrative embodiments give details for binary matrix multiplication. This case illustrates the fundamental ideas of the approach. Matrix multiplication of binary matrices also has applications in social network analysis.

Social networks of current interest are too large for our circuit methods to be practical for neuromorphic architectures in the near future. Also social network adjacency matrices are sparse, unlike the dense small matrices for convolutional neural networks described above. Nevertheless, the illustrative embodiments briefly review the motivation for matrix multiplication in this setting. One application is computing the clustering coefficient of an N-node graph (or subgraph). The global clustering coefficient is the ratio of the number of triangles in the graph to the number of wedges (length-2 paths) in the graph. A degree-δ node is at the center of $$\binom{\delta}{2}$$

wedges. The global clustering coefficient is the fraction of total wedges in the graph that close into triangles. These triangles are common in social networks, where the central node of a wedge may introduce two neighbors.

Social network analysis researchers believe a high global clustering coefficient (also called transitivity) means the graph has a community structure. For example, Seshadri, Kolda and Pinar assumed constant global clustering coefficients when proving a structural property of social networks they used for their block two-level Erdös-Renyi (BIER) generative model. Orman, Labatut and Cherifi empirically studied the relationship between the community structure and the clustering coefficient. They found that high clustering coefficients did imply community structure, although low clustering coefficients did not preclude it.

To simplify our presentation, the illustrative embodiments focus on the question: Does a graph G have at least τ triangles? The user can pick a value of τ that represents a reasonable community structure for their particular kind of graph. Usually they will compute the total number of wedges D in O(N) time and set τ to some function of D (perhaps just scaling by a constant).

There is a simple depth-2 threshold circuit to solve this problem for a graph G=(V,E). The circuit has an input variable, $x_{ij}$ for i,j,∈V with i<j; the variable $x_{ij}$ is 1 if ij∈E and 0 otherwise. The first layer of the circuit consists of a gate, $g_{ijk}$, for each triple i,j,k,∈V with i<j<k. The gate $g_{ijk}$ computes the value of the linear threshold function $x_{ij}+x_{ik}+x_{jk} \geq 3$ as an output $y_{ijk}$. That is, the gate fires ($y_{ijk}=1$) if and only if all edges in the triangle on i, j, and k are in the graph. The second layer includes a single output gate that computes the linear threshold function $\Sigma_{i,j,k \in V: i<j<k} y_{ijk} \geq \tau$; this gate fires if and only if the number of triangles in G is at least τ. The circuit has $$\binom{n}{3} + 1 = \theta(N^3)$$

gates.

The illustrative embodiments ask (and answer) whether it is possible to beat the size of this threshold circuit in constant depth. This is akin to asking if it is possible to beat the näive matrix multiplication algorithm with an algorithm that performs $O(N^{3-\epsilon})$ operations. In fact, the above threshold circuit is a specialization of the näive matrix multiplication algorithm.

The analysis of the new threshold circuits is more involved than analyzing conventional fast matrix multiplication methods. The illustrative embodiments must explicitly consider sparsity (see Definition 1), a measure of how many times a matrix element or intermediate result is part of a computation during the fast multiplication. Thus, while the illustrative embodiments use existing fast matrix multiplication techniques to achieve the results, they are used in a new context. The performance exploits different features of fast matrix multiplication techniques than have been previously used.

Attention is now turned to the results of the analysis and studies. Consider a fast recursive or divide-and-conquer matrix multiplication algorithm like Strassen's with a runtime complexity $O(N^\omega)$. The illustrative embodiments will consistently use $\omega$ as the exponent in the runtime complexity of the base non-circuit fast matrix multiplication algorithm.

The main result is an $O(d)$-depth, $O(d)$-depth, $\tilde{O}(N^{\omega+O(\gamma^d)})$ gate threshold circuit for multiplying two $N \times N$ matrices with $O(\log(N))$-bit entries, for a positive integer d and the constant $\gamma<1$. The illustrative embodiments also give a $O(\log(\log(N)))$-depth, $\tilde{O}(N^\omega)$-gate circuit for this task. The illustrative embodiments present a simplified circuit of the same complexity for computing the trace of $A^3$, for an $N \times N$ matrix A. This gives triangle counts for a graph G with adjacency to matrix A (see Section 3.1). The circuits implement limited-depth versions of divide-and-conquer matrix multiplication.

Attention is returned to FIG. 1. The seven multiplications computed in Strassen's algorithm are represented by $M_1, \ldots, M_7$, where each $M_i$ involves a multiplication between weighted sums of entries of A and B. The entries of C are then defined in terms of the $M_i$. One can verify by substitution and expansion that the entries of C are set to the proper expressions involving entries of A and B.

Section 2: Fast Matrix Multiplication.
Section 2.1: Strassen's Matrix Multiplication Algorithm.

Strassen developed the first matrix multiplication algorithm requiring $O(N^{3-\epsilon})$ multiplications. Strassen observed that one can compute the matrix product, C=AB for two by two matrices A and B using seven multiplications rather than the 8 multiplications required by the naïve algorithm. The reduction in multiplications comes at the expense of additional additions and subtractions.

FIG. 1 gives Strassen's algorithm for two by two matrices. The algorithm is generalized to $N \times N$ matrices A and B, where $N=2^l$ for some positive integer 1, as follows. We partition A and B into four blocks, each of size N/2×N/2, and let $A_{ij}$ and $B_{ij}$ refer to these blocks, for i, j$\in\{1, 2\}$. The above equations remain correct, however each $M_i$ now represents a multiplication of two N/2×N/2 matrices. The illustrative embodiments can recursively apply the above procedure to perform each of these multiplications until the blocks are individual matrix elements or, for more practical applications, sufficiently small in size. For each of the $l=\log_2 N$ levels of recursion, we invoke seven recursive matrix multiplications, resulting in a total of $7^{\log_2 N}=N^{\log_2 7} \sim N^{2.81}$ scalar multiplications. The recurrence relation for the total number of arithmetic operations is T (N)=7 T (N/2)+18 (N/2)$^2$ and T (1)=O(1), where the 18 (N/2)$^2$ term arises from the eighteen additions or subtractions on N/2×N/2 blocks in the expressions above. From this one can see that the total number of scalar additions or subtractions is also $O(N^{\log_2 7})$.

The divide-and-conquer nature of Strassen's algorithm lends itself to a natural O(log N)—time parallel (PRAM) implementation with a total work of $O(N^{\log_2 7})$ arithmetic operations. The main question the illustrative embodiments consider is whether Strassen's approach and subsequent improvements of it can yield a constant-time algorithm implemented using threshold circuits with $O(N^{3-\epsilon})$ gates, where the latter is a measure of total work. Although scalar multiplications are only performed during the base case of the recursion, matrix additions and subtractions are performed at each level and reuse computed results. Thus a constant-time implementation of the above must perform more than $O(N^{\log_2 7})$ additions or subtractions. In fact, the number of pairwise additions or subtractions exceeds $O(N^3)$; however, using threshold gates the illustrative embodiments are able to more efficiently sum multiple numbers of sufficiently small size.

Although Strassen's seminal approach was based on a fast matrix multiplication algorithm for two by two matrices, subsequent work has yielded improved algorithms by employing a fast matrix multiplication algorithm involving larger square matrices, as well as more sophisticated techniques. The currently best known algorithm requires $O(N^{2.373})$ operations. See the survey by Bläser for a detailed introduction to and history of this area.

Section 3: Threshold Circuits for Counting Triangles in Graphs.
Section 3.1: Problem Statement.

Let A be the $N \times N$ symmetric adjacency matrix of a graph G=(V, E) with N nodes: for $i,j \in V, A_{ij}=A_{ji}=1$ if $ij \in E$, and $A_{ij}=A_{ji}=0$ otherwise. Consider the square of the adjacency matrix, $C=A^2$. For $i,j \in V$ with $i \neq j$, $C_{ij}=\Sigma_{jk \in V}A_{ik}A_{kj}=|\{k \in V | ik \in E \text{ and } jk \in E\}|$ which is the number of paths of length 2 between i and j. If there is an edge between the nodes i and j, then each path of length 2 between them, along with the edge ij, forms a triangle in G. Moreover, every triangle containing i and j arises in this way.

Suppose G has $\Delta$ triangles. Then, $3\Delta=\Sigma_{i,j \in V: i<j}A_{ij}C_{ij}$, since the sum counts each triangle once for each of its edges. Thus, one can count the triangles in G by summing some of the entries of $A^2$. An equivalent computation is the trace of $A^3$, trace($A^3$), which (from (1)) is equal to $6\Delta$.

The illustrative embodiments employ a threshold circuit implementation of fast matrix multiplication algorithms to compute the sum in constant depth using $O(N^{3-\epsilon})$ gates. In fact, the exponent of the gate count can be made arbitrarily close to the exponent of the arithmetic operation count for the best possible fast matrix multiplication algorithm.

The illustrative embodiments explain the notion of a fast matrix multiplication algorithm. The illustrative embodiments assume that given an algorithm for multiplying two T×T matrices using a total of r multiplications (for Strassen's algorithm, T=2 and r=7). The illustrative embodiments assume $N=T^l$ for some positive integer 1. As outlined in Section 2.1, this yields a recursive algorithm for computing the product of two $N \times N$ matrices, C=AB, using a total of $r^l=r^{\log_T N}=N^{\log_T r}$ scalar multiplications.

As with Strassen's algorithm, the illustrative embodiments assume that given a list of r expressions for each of the multiplications, $M_1, \ldots, M_r$; the illustrative embodiments view each $M_i$ as an expression involving the $T^2$ different N/T×N/T blocks of A and B. In particular, each $M_i$ is a product of a $\{-1,1\}$-weighted sum of blocks of A with a $\{-1,1\}$-weighted sum of blocks of B. We also assume the fast matrix multiplication algorithm provides a list of $T^2$ expressions, each representing a N/T×N/T block of C as a $\{-1,1\}$-weighted sum of the $M_i$. Although the illustrative embodiments do not present details here, the techniques can be extended for fast matrix multiplication algorithms in which more general relational weights are employed.

For $1 \leq i \leq r$, let $a_i$ be the number of distinct blocks of A that appear in the expression $M_i$, and let $b_i$ be defined analogously with respect to B. The illustrative embodiments let $c_i$ be the number of expressions for blocks of C in which $M_i$ appears. Definition 1: The illustrative embodiments let $s_A=\Sigma_{1 \leq i \leq r}a_i, s_B=\Sigma_{1 \leq i \leq r}b_i$, and $s_C=\Sigma_{1 \leq i \leq r}c_i$, The illustrative embodiments define the sparsity of a fast matrix multiplication algorithm as $s=\max\{s_A,s_B,s_C\}$. Ballard et al. considers sparsity in analyzing and improving the numerical stability of fast matrix multiplication algorithms.

Section 3.2 Basic $TC^0$ Arithmetic Circuits.

The illustrative embodiments first develop the fundamental $TC^0$ arithmetic circuits on which the results rely. The circuits are designed with neuromorphic implementation in mind, and The illustrative embodiments try to favor simple constructions over those that offer the least depth or gate count.

The first circuit follows from a classical technique to compute symmetric functions in $TC^0$ by Muroga from 1959. It is also a special case of a more general result by Siu et al. The illustrative embodiments include a proof to demonstrate the simplicity of the construction.

Lemma 2. Let $s=\Sigma_i w_i x_i \in [0, 2^l]$ be an integer-weighted sum of bits, $x_i \in \{0,1\}$. The kth most significant bit of s can be computed by a depth-2 threshold circuit using $2^k+1$ gates. The kth most significant bit of s is 1 precisely when s lies in one of the intervals $[i2^{l-k}, (i+1)2^{l-k})$ for some odd integer $1 \le i \le 2^k$. The first layer of the circuit computes the function $y_i := \text{bool}(s \ge i2^{l-k})$ for $1 \le i \le 2^k$. The output of the circuit is $\text{bool}(\Sigma_{i\ odd}(y_i - y_{i+1}) \ge 1)$, since $y_i - y_{i+1}$ is 1 if $s \in [i2^{l-k}, (i+1)2^{l-k})$ and 0 is otherwise.

The illustrative embodiments build upon the above to obtain the primary addition circuit. The result below may be viewed as a slightly stronger version of Siu et al.'s Lemma 2 for the depth 2 case.

Corollary 3. Given n nonnegative integers, each with b bits, their sum can be computed by a depth-2 threshold circuit O(bn) gates.

Proof. For convenience the illustrative embodiments define $\log_2(m)$ as the least integer 1 such that $m<2^l$. Let s be the sum of the n integers, $z_1, \ldots, z_n$; s requires at most $\log_2(n(2^b-1)) \le \log_2(n)+b$ bits. First the illustrative embodiments compute the jth (least significant) bit of s, for $1 \le j \le b$. Let $s_j = \Sigma_i \tilde{z}_i$, where $\tilde{z}_i$ is obtained from $z_i$ by ignoring all but the least significant j bits. Note that $s_j$ requires at most $\log_2(n)+j$ bits, and the jth bit of s and $s_j$ are equal. The illustrative embodiments can compute this bit using $2n+1$ gates, applying Lemma 2 on $s_j$ with $k=\log_2(n)+1$. Thus $b(2n+1)$ gates suffice to compute the b least significant bits of s.

The remaining $\log_2(n)$ most significant bits of s may be computed using $O(n \log n)$ gates by appealing to Lemma 2 for each bit. This improved O(n) gates by observing that functions $y_i$ computed for $k=\log_2(n)$ in the proof of Lemma 2 include those required for all of the most significant $\log_2(n)$ bits of s. Thus the illustrative embodiments need $2^{\log_2(n)} \le 2n$ gates to compute all of the $y_i$ in the first layer and an additional $\log_2(n)$ output gates for each bit. This gives a total of $2(b+1)n+\log_2(n)$ gates to compute all $\log_2(n)+b$ bits of s.

Lemma 4. (Theorem 2.9, Siu and Roychowdhury [19]) Given n numbers, each with n bits, all the bits of their $n^2$-bit product can be computed by depth-4 threshold circuit with a number of gates that is polynomial in n.

Although the circuits corresponding to the above Lemma are more involved than the others required, the illustrative embodiments will only be multiplying numbers with $O(\log N)$ bits and can look to simpler alternatives for practical implementation.

The "numbers" in the above Lemmas refer to nonnegative integers, however the results above can be extended to handle negative integers, with a constant-factor overhead in a gate and wire count. In particular, the illustrative embodiments will need to take weighted sums of numbers with weights in $\{-1, 1\}$. The illustrative embodiments will represent each integer x as $x=x^+-x^-$, where $x^+$ and $x^-$ are each nonnegative, and at most one of the two is nonzero. Other representations are possible, but the illustrative embodiments select this one as it makes for a simpler presentation and implementation. Observe that Lemma 2 allows for negative weights $w_i$ in the sum s; if $s<0$, then the circuit will output 0 for each bit. The illustrative embodiments can take two copies of the circuit in parallel, feeding $x^+$ to one and $x^-$ to the other. At most, one of the two circuits will output a nonzero answer, hence the illustrative embodiments may obtain $s^+$ and $s^-$ for each bit $s_i$ of s. This extends to Corollary 3 as well. Computing the product of such values will also incur extra overhead as $xy=(x^+-x^-)(y^+-y^-)=x^+y^+ + x^-y^- - x^+y^- - x^-y^+$ will require additional multiplications, however this is a constant-factor overhead. For the sake of exposition, the illustrative embodiments proceed as if only computing positive quantities takes place.

Section 3.3: A Subcubic $TC^0$ Circuit for Matrix Multiplication.

The circuits for matrix multiplication implement a given conventional fast matrix multiplication algorithm in both a depth-efficient and gate-efficient manner. The illustrative embodiments define trees $T_A$ and $T_B$ for the input matrices A and B, respectively, based on the recursive or divide-and-conquer structure of the fast matrix multiplication algorithm. The nodes in $T_A$ represent weighted sums of blocks of A and likewise for $T_B$. The root of $T_A$ represents the matrix A, while the leaves represent weighted sums of its entries. See FIG. 2 for a detailed explanation.

In a conventional PRAM implementation of a fast matrix multiplication algorithm, all the matrices at each level of $T_A$ and $T_B$ are computed, and the results are reused. Since there are $O(\log N)$ levels, the illustrative embodiments cannot hope to compute all the matrices at each level in a constant depth circuit, however the illustrative embodiments show that one may compute a constant number of levels of $T_A$ and $T_B$ in a way that allows use of a number of gates that is arbitrarily close to the total work performed by the fast matrix multiplication algorithm.

The illustrative embodiments assume, as in Section 3.1, that a fast matrix multiplication algorithm multiplies two T×T matrices using r multiplications. The illustrative embodiments describe an improved $TC^0$ circuit for computing the values at the leaves of $T_A$. The results extend naturally to computing the leaves of $T_B$. Level h of $T_A$ contains $r^h$ nodes, each corresponding to an $N/T^h \times N/T^h$ matrix. Moreover, each entry of each matrix at level h is the $\{1,1\}$-weighted sum of at most $T^{2h}$ entries of the root matrix, A. Hence if each entry of the integer matrix requires at most b bits, the number of bits required for each entry of a matrix at level h is at most $\lceil \log_2(2^b T^{2h}) \rceil = b + \lceil 2h \log_2 T \rceil$ (2)

For the main results, the illustrative embodiments assume $b=O(\log N)$ bits.

The illustrative embodiments give a sub-cubic $TC^0$ circuit for computing C=AB, however the illustrative embodiments first illustrate the main ideas by showing how to compute trace($A^3$). As mentioned in Section 3.1, this allows for counting triangles in a graph. The bulk of the work lies in showing how to compute the $N^{\log_T r}$ scalar products prescribed by the fast matrix multiplication algorithm. Each such scalar product is one between a weighted sum of entries of A and a weighted sum of entries of B. The illustrative embodiments next show how to compute these weighted sums for A with a circuit that computes a constant number of levels of $T_A$. An analogous construction works for B.

The illustrative embodiments select t levels, $0=h_0<h_1<h_2<\ldots<h_t$, and the $TC^0$ circuit computes all of the matrices at these t levels of $T_A$. The illustrative embodiments must compute the leaves of $T_A$, hence $h_t=\log_T N$. The benefit of computing level $h_i$ is that each entry of each matrix at level $h_{i+1}$ is then a $\{-1,1\}$-weighted sum of at most $T^{2(h_{i+1}-h_i)}$ entries of matrices at level $h_i$.

The results rely on parameters associated with the fast matrix multiplication algorithm. Recall $S_A$ from Definition 1. The illustrative embodiments define $\alpha=r/s_A$ and $\beta=s_A/T^2$, and assert that $0<\alpha\leq 1$ and $\beta\geq 1$ (for Strassen's algorithm, $\alpha=7/12$ and $\beta=3$).

Lemma 5. For $1\leq i\leq t$, if the matrices at level $h_{i-1}$ of $T_A$ have been computed, then the matrices at level $h_i$ can be computed in depth 2 using $O((b+h_{i-1})\alpha^{h_{i-1}}\beta^{h_i}N^2)$ gates.

Proof. The $r^{h_i}$ nodes at level $h_i$ of $T_A$ each correspond to an $N/T^{h_i}\times N/T^{h_i}$ matrix. The illustrative embodiments set $\delta_i=h_i-h_{i-1}$ for convenience. The illustrative embodiments may associate each node u at level $h_i$ with the unique subtree rooted at level $h_{i-1}$ that contains it. The $N/T^{h_i}\times N/T^{h_i}$ matrix corresponding to u sum is a sum of at most $T^{2\delta_i}$ blocks of the $N/T^{h_{i-1}}\times N/T^{h_{i-1}}$ matrix associated with the root of the subtree containing u.

The illustrative embodiments seek a better bound on the number of such blocks that must be summed to obtain the matrix associated with u. Let size(u) represent this quantity, and let root(u) be the node at level $h_{i-1}$ on the path from u to the root of $T_A$. Recall that each edge of $T_A$ corresponds to one of the fast matrix multiplication expressions, $M_i$ and that $a_i$ is the number of distinct blocks of A that appear in $M_i$ (defined in Section 3.1). The quantity size(u) is the product of the $a_i$ associated with the edges on the path from u to root(u) (see FIG. 2). Thus, for each node v at level $h_{i-1}$, The illustrative embodiments have:

$$\sum_{\{u|root(u)=v\}} size(u) = \sum_{m_1+\ldots+m_r=\delta_i} \binom{\delta_i}{m_1,\ldots,m_r} \prod_{1\leq j\leq r} a_j^{m_j} = s_A^{\delta_i} \quad (3)$$

where the last equality follows from the multinomial theorem. The illustrative embodiments now bound the number of gates required to compute the matrices at level $h_i$. Since the illustrative embodiments assume the matrices at level $h_{i-1}$ have been computed, by Corollary 3, each entry of the matrix associated with node u at level $h_i$ can be computed using $O((b+h_{i-1})size(u))$ gates in depth 2. The illustrative embodiments charge the gate count for u to root(u), and by equations (3) and (2), the number of gates to charged to each node at level $h_{i-1}$ is $O((b+h_{i-1})s_A^{h_i-h_{i-1}}N^2/T^{2h_i})$, hence the total number of gates required for level $h_i$ is $O((b+h_{i-1})r^{h_{i-1}}s_A^{h_i-h_{i-1}}N^2/T^{2h_i})=O((b+h_{i-1})(r/s_A)^{h_{i-1}}(s_A/T^2)^{h_i}N^2)$ as desired.

Next, the illustrative embodiments show how to set the $h_i$ so that the number of gates required at each level is approximately balanced. This will yield a total gate count that is, at worst, within a factor of t of the gate count for an optimal setting of the $h_i$. The illustrative embodiments will need to assume the number of multiplications our fast $T\times T$ matrix multiplication algorithm required is greater than $T^2$. The results, as stated and proven below, do not hold if an optimal fast matrix multiplication algorithm where the number of multiplications, $r=T^2$. The illustrative embodiments set $\gamma=\log_\beta(1/\alpha)$. Note that $0<\gamma<1$ since $r>T^2$ is equivalent to $\alpha\beta>1$ (for Strassen's algorithm, $\gamma\approx 0.491$).

Lemma 6. Let $h_i=\lceil(1-\gamma^i)\rho\rceil$, for some $\rho>0$. Then all the matrices at levels $h_1,\ldots,h_t$ of $T_A$ can be computed in depth 2t using $O(t(\alpha\beta)^\rho(b+\text{Log }N)N^2)$ gates.

Proof. The illustrative embodiments have $h_i\leq \log_T N$ for all $0\leq i\leq t$ since the latter is the height of $T_A$. By Lemma 5, level $h_i$ can be computed in depth 2 using $O((b+\log N)\alpha^{h_{i-1}}\beta^{h_i}\beta^{h_i}N^2)$ gates. Let $\tilde{h}_i=(1-\gamma^i)\rho$. Observe that $\Sigma_{1\leq i\leq t}\alpha^{h_{i-1}}\beta^{h_i}<\beta\Sigma_{1\leq i\leq t}\alpha^{\tilde{h}_{i-1}}\beta^{\tilde{h}_i}$, hence it suffices to bound $\Sigma_{1\leq i\leq t}\alpha^{\tilde{h}_{i-1}}\beta^{\tilde{h}_i}$.

The terms in the sum are equal:

$$\alpha^{\tilde{h}_{i-1}}\beta^{\tilde{h}_i} = \left(\frac{\alpha\beta}{\alpha^{\gamma_{i-1}}\beta^{\gamma_i}}\right)^\rho = \left(\frac{\alpha\beta}{\alpha^{\gamma_{i-1}}(\beta^\gamma)^{\gamma_{i-1}}}\right)^\rho = (\alpha\beta)^\rho,$$

from which the claim follows.

The above Lemma establishes a tradeoff in the following sense. The value $\rho$ impacts the total number of gates, however the illustrative embodiments require that $h_t=\log_T N$, which imposes constraints on t and, consequently, the depth of the circuit. The larger $\rho$, the smaller t needs to be in order for $h_t=\log_T N$.

The illustrative embodiments note that the natural strategy of taking $h_i=i \log_T N/t$ yields a weaker result that will be obtained. A comparable weaker result can be obtained directly computing the leaves of $T_A$ without computing intermediate levels. However, this results in sums of larger magnitude, and more involved gate-efficient addition circuits are needed of Siu et al. A disadvantage of using the latter circuits is that they require a significantly larger number of wires.

The illustrative embodiments now establish the main theorems by better quantifying the tradeoff between $\rho$ and t. For these theorems the illustrative embodiments assume that given a fast matrix multiplication algorithm and take $\omega=\log_T r$.

Theorem 7. The illustrative embodiments are given integer $\tau$ and an $N\times N$ integer matrix A with entries of size $O(\log N)$ bits. There is a threshold circuit of depth $O(\log\log N)$ that determines whether trace $(A^3)\geq\tau$ using $O(N^\omega)$ gates.

Proof. The illustrative embodiments appeal Lemma 6, setting $\rho=\log_T N$. The gate bound follows from $(\alpha\beta)^\rho=(r/T^2)^{\log_T N}=N^{\omega-2}$. To bound the depth, the illustrative embodiments set $t=\lceil\log_{1/\gamma}\log_T N\rceil+1>\log_{1/\gamma}\log_T N$. This implies $$\log_T N - 1(1-\gamma^t)\log_T N < \log_T N - \left(1-\frac{1}{\log_T N}\right)\log_T N = 1.$$

Thus $h_t=\lceil(1-\gamma^t)\log_T N\rceil=\log_T N$ as desired.

This shows that the illustrative embodiments can compute the values corresponding to the leaves at $T_A$ and $T_B$ in the stated gate and depth bounds. One may see that each entry $C_{ij}$ is a weighted sum of products, $\Sigma_{k\in I_{ij}}w_{ijk}P_k$ where each $P_k$ corresponds to a product between a leaf of $T_A$ and the corresponding leaf of $T_B$ with each weight $w_{ijk}\in\{-1,1\}$. The illustrative embodiments seek to compute $$\frac{\text{trace}(A^3)}{2} = \Sigma_{i<j}A_{ij}C_{ij} = \Sigma_{i<j}A_{ij}\left(\Sigma_{k\in I_{ij}}w_{ijk}P_k\right) = \Sigma_k P_k\left(\Sigma_{i<j;k\in I_{ij}}w_{ijk}A_{ij}\right).$$

Thus for each product, $P_k$, the illustrative embodiments want to multiply it with a $\{-1,1\}$-weighted sum over entries of A. The illustrative embodiments may compute these weighted sums independently and in parallel with those for A and B using the same techniques. Thus the illustrative embodiments seek to compute $N^\omega$ products of $3O(\log N)$-bit numbers, and appeal to Lemma 4 to accomplish this in depth 4 using a total of $\tilde{O}(N^\omega)$ gates.

The illustrative embodiments now prove the main theorem by exhibiting a more refined tradeoff between $\rho$ and t.

Theorem 8. The illustrative embodiments are given integer $\tau$, and $N\times N$ integer matrix A with entries of size $O(\log N)$ bits, and a positive integer d. There is a threshold circuit depth at most $2d+5$ that determines whether trace $(A^3)\geq\tau$ using $\tilde{O}(dN^{\omega+c\gamma^d})$ gates, where c>0 and γ<1 are constants with respect to N and d that depend on the parameters of the fast matrix multiplication algorithm employed.

Proof. As for the previous theorem, the illustrative embodiments appeal to Lemma 6, this time setting $\rho=\log_T N + \in \log_{\alpha\beta} N$, for constant ∈>0 whose value is given below. The illustrative embodiments have $(\alpha\beta)^\rho = (r/T^2)^{\log_T N} N^\in = N^{\omega-2+\in}$.

The illustrative embodiments set $\in = \gamma^d \log_T(\alpha\beta)/(1-\gamma) > \gamma^d \log_T(\alpha\beta)/(1-\gamma^d)$. This implies:

$$\log_T N - (1-\gamma^d)(\log_T N + \in \log_{\alpha\beta} N) <$$
$$\log_T N - (1-\gamma^d)\left(\log_T N + \left(\frac{\gamma^d}{1-\gamma^d}\right)\log_T(\alpha\beta)\log_{\alpha\beta} N\right) =$$
$$\log_T N - (1-\gamma^d)\log_T N - \gamma^d \log_T N = 0,$$

hence the illustrative embodiments may take t<d in Lemma 6 in order to have $h_t = \log_T N$. The theorem follows from the argument used in the proof of Theorem 7 and taking $c = \log_T(\alpha\beta)/(1-\gamma)$ (for Strassen's algorithm, c≈1.585).

The illustrative embodiments describe how to compute the entries of C for the more general case of computing the product AB. The illustrative embodiments define a tree $T_{AB}$ with the same structure as $T_A$ and $T_B$. Each node of $T_{AB}$ represents the product of the matrices of the corresponding nodes of $T_A$ and $T_B$. Hence the root of $T_{AB}$ represents the matrix C=AB, and the leaves represent the $N^{\log_T r}$ scalar products computed by our fast matrix multiplication algorithm. The illustrative embodiments will compute the root of $T_{AB}$ in a bottom-up manner assuming that the illustrative embodiments are only computing the nodes at levels $\log_T N = h_t > h_{t-1} > \ldots > h_1 > h_0 = 0$. Let $\alpha_C = r/s_C$ and $\beta_C = s_C/T^2$.

Lemma 9. For 1≤i≤t, if matrices at level $h_i$ of $T_{AB}$ have been computed, then the matrices at level $h_{i-1}$ can be computed in depth 2 using $O((b+h_{i-1})\alpha_C^{h_{i-1}}\beta_C^{h_i}N^2)$ gates.

Proof. The proof uses a similar analysis to that of Lemma 5. The illustrative embodiments will need new parameters derived from the fast matrix multiplication algorithm. For $1 \le j \le T^2$, use j to index $T^2$ expressions for entries of C, and define $\dot{c}_j$ as the number of $M_i$ that appear in the expression corresponding to j. For Strassen's algorithm (FIG. 1), the illustrative embodiments have $\dot{c}_1=4$, $\dot{c}_2=2$, $\dot{c}_3=2$, and $\dot{c}_4=4$. Recall the parameter $s_C$ from Definition 1, and observe that $s_C = \Sigma_{1\le j \le T^2} \dot{c}_j$.

The illustrative embodiments assume the matrix products at level $h_i$ of $T_{AB}$ have been computed and compute a node u at level $h_{i-1}$. The matrix at node u is composed of $T^{2\delta_i}$ weighted sums of blocks of size $N/T^{h_i} \times N/T^{h_i}$ from level $h_i$. The illustrative embodiments seek to bound the number of terms in each sum. Consider $T^2$-ary tree height of $\delta_i$ rooted at u. The children of each node correspond to the $T^2$ expressions for entries of C, and corresponding edges are labeled with the $\dot{c}_j$. Using this tree in place of $T_A$ in Lemma 5, the result follows from the argument used in that proof.

The illustrative embodiments obtain the final circuit by using the above Lemma with arguments analogous to Theorem 7 and 8.

Section 3.4: Open Problems.

The main open problem is whether the illustrative embodiments can do matrix multiplication with $O(N^\omega)$ gates in constant depth. Theorem 7 shows this can be done in O(log log N) depth. Another open question is lower bounds: What is the minimum depth of a threshold circuit for computing matrix products using $O(N^{3-\in})$ gates? Can one show that a constant depth threshold circuit using $O(N^\omega)$ gates yields an O(log N) PRAM algorithm with $O(N^\omega)$ work?

The circuits are L-uniform. Can a stronger uniformity condition be imposed?

One advantage of neural networks is their low energy relative to CMOS-based electronics. One possible energy model for threshold gates is to charge a gate only if it fires. That is, charge a gate one unit of energy for sending a signal if and only if the weighted sum of the inputs exceeds the threshold. What is the energy complexity of these kinds of matrix multiplication circuits? This will depend on the input class.

Figure 4:
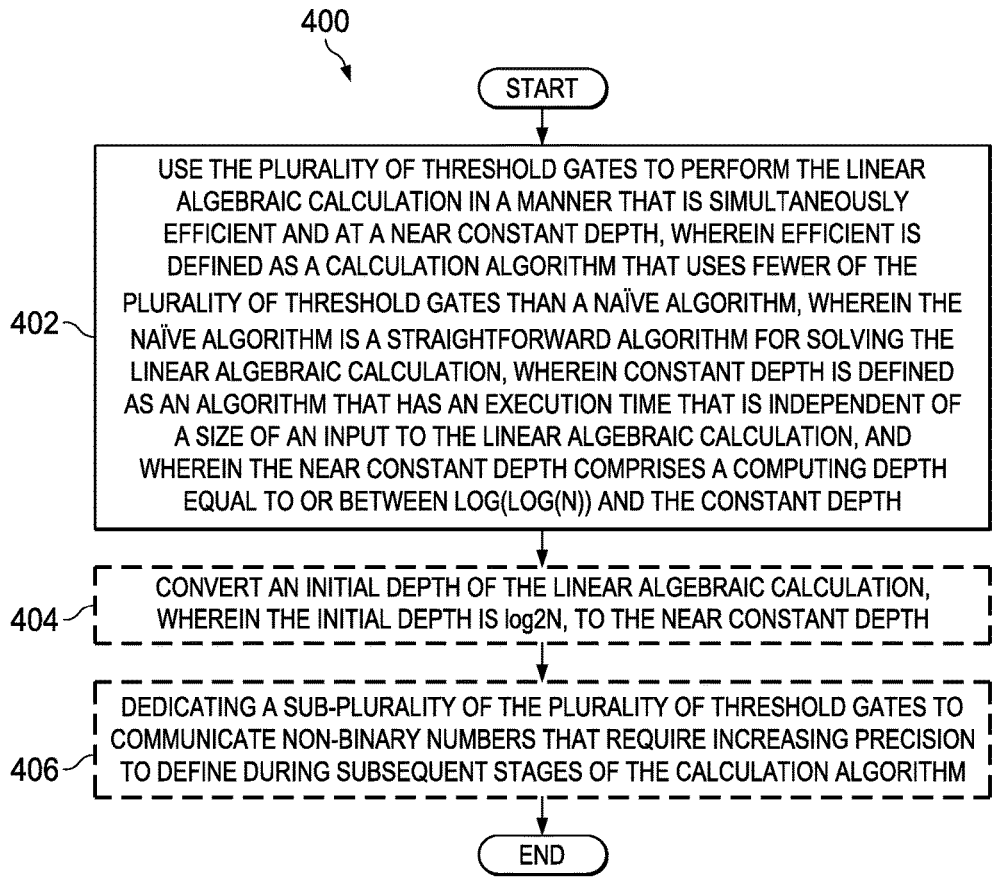
FIG. 4 illustrates a flowchart of a method of increasing an efficiency at which a plurality of threshold gates arranged as neuromorphic hardware is able to perform a linear algebraic calculation having a dominant size of N in accordance with an illustrative embodiment.

FIG. 4 illustrates a flowchart of a method of increasing an efficiency at which a plurality of threshold gates arranged as neuromorphic hardware are able to perform a linear algebraic calculation having a dominant size of N, in accordance with an illustrative embodiment. Method 400 may be executed as an algorithm in neuromorphic hardware, or as application-specific neuromorphic hardware circuits.

Method 400 may be characterized as a method of increasing an efficiency at which a plurality of threshold gates arranged as neuromorphic hardware are able to perform a linear algebraic calculation having a dominant size of N. Method 400 may include using the plurality of threshold gates to perform the linear algebraic calculation in a manner that is simultaneously efficient and at a near constant depth, wherein "efficient" is defined as a calculation algorithm that uses fewer of the plurality of threshold gates than a naïve algorithm, wherein the naïve algorithm is a straight forward algorithm for solving the linear algebraic calculation, wherein "constant depth" is defined as an algorithm that has an execution time that is independent of a size of an input to the linear algebraic calculation, and wherein the near constant depth comprises a computing depth equal to or between O(log(log(N))) and the constant depth (operation 402). In one illustrative embodiment, method 400 may terminate thereafter.

Method 400 may be varied. For example, in one illustrative embodiment, the linear algebraic calculation comprises matrix multiplication of two square matrices of size N×N. In another illustrative embodiment, the method of claim 2 wherein the calculation algorithm has a first number of operations of $O(N^{2+\delta})$ compared to the straight forward algorithm having a second number of operations of $O(N^3)$, wherein ω comprises a number that is greater than or equal to zero but less than one.

In this case, method 400 may include optional steps. For example, method 400 optionally may also include converting an initial depth of the linear algebraic calculation, wherein the initial depth is $\log_2 N$, to the near constant depth (operation 404). In addition, when the near constant depth is the constant depth, then converting includes setting the constant depth to a value of at most 2d+5 that determines whether trace $(A^3) \ge \tau$ using $\tilde{O}(dN^{\omega+c\gamma^d})$ of the plurality of threshold gates, where C>0 and γ≤1 are constants with respect to N and d that depend on parameters of the calculation algorithm. The constant depth can be set to a value of at most 2d+5 that determines whether trace $(A^3) \ge \tau$ using $\tilde{O}(dN^{\omega+c\gamma^d})$ of the plurality of threshold gates, where c>0 and γ<1 are constants with respect to N and d that depend on parameters of the calculation algorithm, wherein d is a constant, and wherein ω is between exactly 2 and less than 3. In a related illustrative embodiment, method 400 may also optionally include dedicating a sub-plurality of the plurality of threshold gates to communicate non-binary numbers that require increasing precision to define during subsequent stages of the calculation algorithm (operation 406).

In a different illustrative embodiment, the linear algebraic calculation comprises a matrix inversion. In a still different illustrative embodiment, the linear algebraic calculation comprises multiplying at least two matrices in order to count triangles in a graph G.

Still further variations are possible, such as those described above with respect to sections 2 through 3. Other variations are possible, including more, fewer, or different operations. Thus, the claimed inventions are not necessarily limited to the illustrative embodiments described with respect to FIG. 4.

Figure 5:
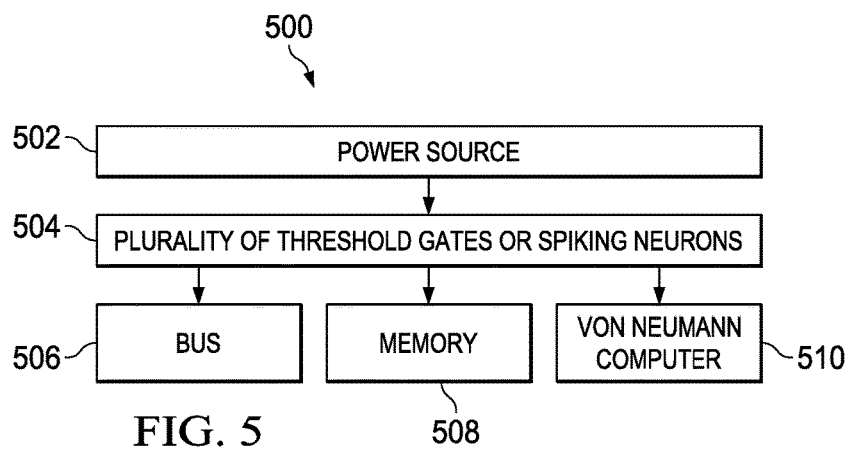
FIG. 5 illustrates a block diagram of a neuromorphic computer in accordance with an illustrative embodiment.

FIG. 5 illustrates a block diagram of a neuromorphic computer, in accordance with an illustrative embodiment. Neuromorphic computer 500 may be used to perform the linear algebraic calculations described above. Neuromorphic computer 500 is strictly a hardware device implemented as one or more computer chips.

Neuromorphic computer 500 may be plurality of threshold gates or spiking neurons 504. Plurality of threshold gates or spiking neurons 504 may be configured to compute a specific linear algebraic calculation having a dominant size of N in a manner that is simultaneously efficient and at a near constant depth, wherein "efficient" is defined as a calculation algorithm that uses fewer of the plurality of threshold gates than a naïve algorithm, wherein the naïve algorithm is a straightforward algorithm for solving the specific linear algebraic calculation, wherein "constant depth" is defined as an algorithm that has an execution time that is independent of a size of an input to the specific linear algebraic calculation, and wherein the near constant depth comprises a computing depth equal to or between $O(\log(\log(N)))$ and the constant depth.

Neuromorphic computer 500 may also include other components, such as power source 502, bus 506, and memory 508. Neuromorphic computer 500 may also be in communication with von Neumann computer 510 (a more typical computer).

Neuromorphic computer 500 may be varied. For example, the specific linear algebraic calculation comprises a matrix multiplication of two square matrices of size N×N. In this case, the calculation algorithm has a first number of operations of $O(N^{2+\delta})$ compared to the straight forward algorithm having a second number of operations of $O(N^3)$, wherein $\omega$ comprises a number that is greater than or equal to zero but less than one.

In a related illustrative embodiment, the plurality of threshold gates or spiking neurons is further configured to convert an initial depth of the specific linear algebraic calculation to the near constant depth, wherein the initial depth is $\log_2 N$. Furthermore, the near constant depth may be the constant depth, and wherein in being configured to convert, the plurality of threshold gates or spiking neurons are further configured to set the constant depth to a value of at most 2d+5 that determines whether trace $(A^3) \geq \tau$ using $\tilde{O}(dN^{\omega+C\gamma^d})$ of the plurality of threshold gates or spiking neurons, where C>0 and γ<1 are constants with respect to N and d that depend on parameters of the calculation algorithm, wherein d is a constant, and wherein ω is between exactly 2 and less than 3.

In another illustrative embodiment, a sub-plurality of the plurality of threshold gates or spiking neurons are dedicated to communicate non-binary numbers that require increasing precision to define during subsequent stages of the calculation algorithm. In still another illustrative embodiment, the specific linear algebraic calculation comprises a matrix inversion. In yet another illustrative embodiment, the specific linear algebraic calculation comprises multiplying at least two matrices in order to count triangles in a graph G.

Still further variations are possible, such as those described above with respect to sections 2 through 3. Other variations are possible, including more, fewer, or different components. Thus, the claimed inventions are not necessarily limited to the illustrative embodiments described with respect to FIG. 5.

Figure 6:
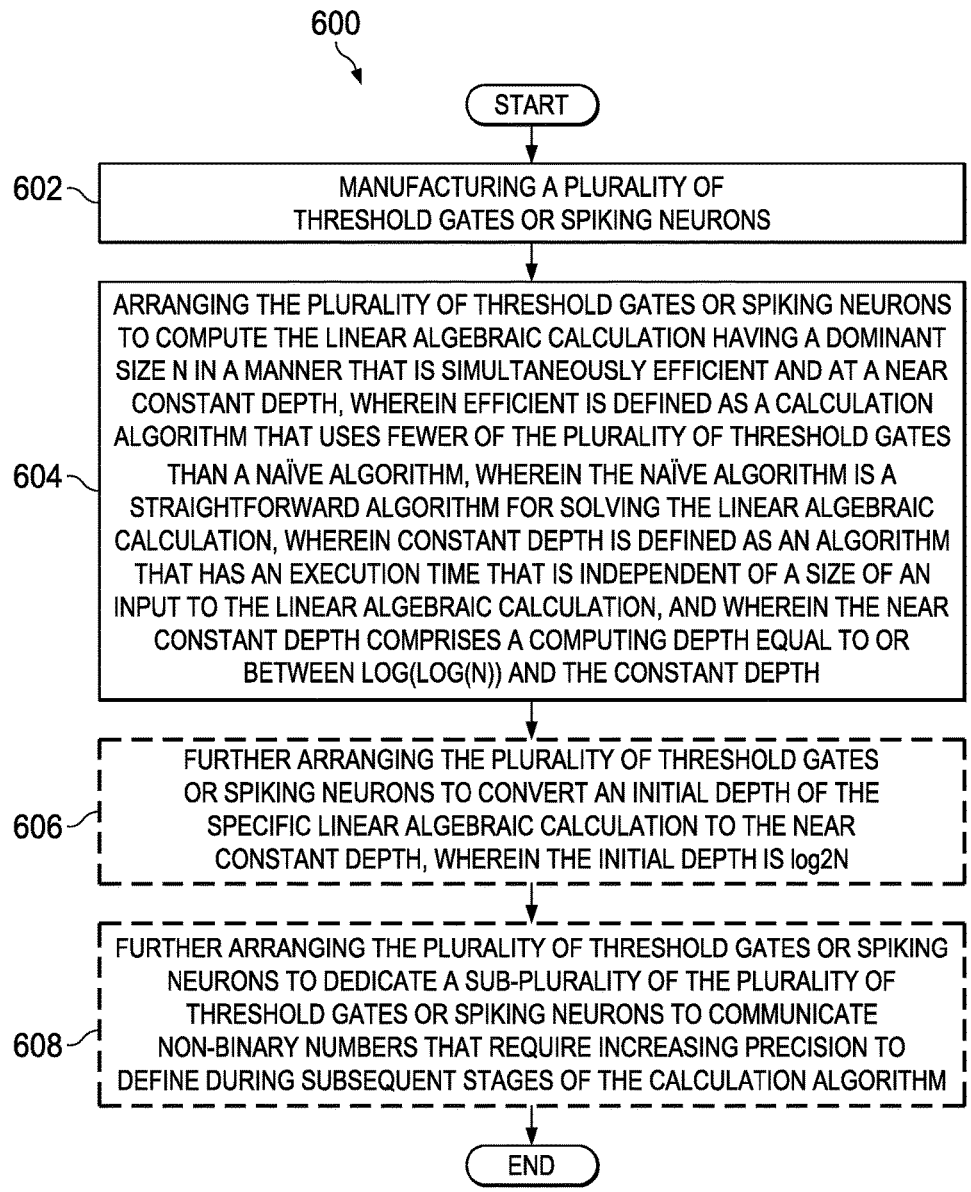
FIG. 6 illustrates a flowchart of a method of manufacturing a neuromorphic computer tailored to perform a specific linear algebraic calculation in accordance with an illustrative embodiment.

FIG. 6 illustrates a flowchart of a method of manufacturing a neuromorphic computer tailored to perform a specific linear algebraic calculation, in accordance with an illustrative embodiment. Method 600 is a manufacturing method for making a tangible circuit or computer chip. Thus, method 600 may be characterized as a method of manufacturing a neuromorphic computer tailored to perform a specific linear algebraic calculation.

Method 600 includes manufacturing a plurality of threshold gates or spiking neurons (operation 602). Method 600 may also include arranging the plurality of threshold gates or spiking neurons to compute the linear algebraic calculation having a dominant size N in a manner that is simultaneously efficient and at a near constant depth, wherein "efficient" is defined as a calculation algorithm that uses fewer of the plurality of threshold gates than a naïve algorithm, wherein the naïve algorithm is a straightforward algorithm for solving the linear algebraic calculation, wherein "constant depth" is defined as an algorithm that has an execution time that is independent of a size of an input to the linear algebraic calculation, and wherein the near constant depth comprises a computing depth equal to or between $O(\log(\log(N)))$ and the constant depth (operation 604). In one illustrative embodiment, the method may terminate thereafter.

Method 600 may be varied. For example, the specific linear algebraic calculation comprises matrix multiplication of two square matrices of size N×N.

Method 600 may include additional operations. For example, optionally, method 600 may include further arranging the plurality of threshold gates or spiking neurons to convert an initial depth of the specific linear algebraic calculation to the near constant depth, wherein the initial depth is $\log_2 N$ (operation 606). In still another illustrative embodiment, method 600 may, in addition to or in place of operation 606, also include further arranging the plurality of threshold gates or spiking neurons to dedicate a sub-plurality of the plurality of threshold gates or spiking neurons to communicate non-binary numbers that require increasing precision to define during subsequent stages of the calculation algorithm (operation 608). In one illustrative embodiment, the method may terminate thereafter.

Still further variations are possible, such as those described above with respect to sections 2 through 3. Other variations are possible, including more, fewer, or different operations. Thus, the claimed inventions are not necessarily limited to the illustrative embodiments described with respect to FIG. 6.

Figure 7:
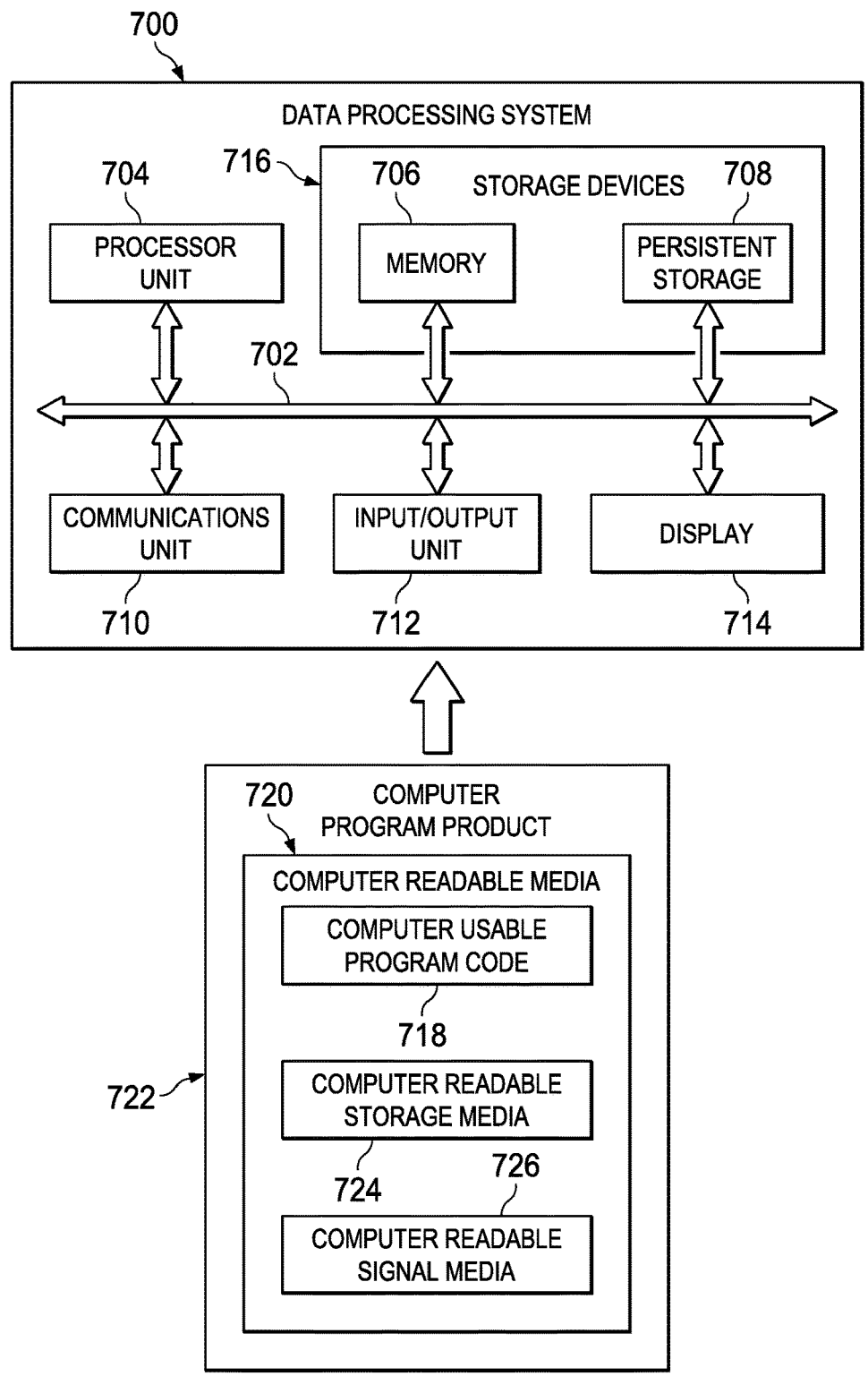
FIG. 7 illustrates a data processing system in accordance with an illustrative embodiment.

Turning now to FIG. 7, an illustration of a data processing system is depicted in accordance with an illustrative embodiment. Data processing system 700 in FIG. 7 is an example of a data processing system that may be used to implement a general processing unit (GPU). Data processing system 700 may also be used to implement the illustrative embodiments, such as a spiking neural network algorithm, including but not limited to those shown above. However, in this case, processor unit 704 is replaced with neuromorphic hardware. In this illustrative example, data processing system 700 includes communications fabric 702, which provides communications between processor unit 704, memory 706, persistent storage 708, communications unit 710, input/output (I/O) unit 712, and display 714.

Processor unit 704 serves to execute instructions for software that may be loaded into memory 706. Processor unit 704 may be a number of processors, a multi-processor core, or some other type of processor, depending on the particular implementation. A number, as used herein with reference to an item, means one or more items. Further, processor unit 704 may be implemented using a number of heterogeneous processor systems in which a main processor is present with secondary processors on a single chip. As another illustrative example, processor unit 704 may be a symmetric multi-processor system containing multiple processors of the same type.

Memory 706 and persistent storage 708 are examples of storage devices 716. A storage device is any piece of hardware that is capable of storing information, such as, for example, without limitation, data, program code in functional form, and/or other suitable information either on a temporary basis and/or a permanent basis. Storage devices 716 may also be referred to as computer readable storage devices in these examples. Memory 706, in these examples, may be, for example, a random access memory or any other suitable volatile or non-volatile storage device. Persistent storage 708 may take various forms, depending on the particular implementation.

For example, persistent storage 708 may contain one or more components or devices. For example, persistent storage 708 may be a hard drive, a flash memory, a rewritable optical disk, a rewritable magnetic tape, or some combination of the above. The media used by persistent storage 708 also may be removable. For example, a removable hard drive may be used for persistent storage 708.

Communications unit 710, in these examples, provides for communications with other data processing systems or devices. In these examples, communications unit 710 is a network interface card. Communications unit 710 may provide communications through the use of either or both physical and wireless communications links.

Input/output (I/O) unit 712 allows for input and output of data with other devices that may be connected to data processing system 700. For example, input/output (I/O) unit 712 may provide a connection for user input through a keyboard, a mouse, and/or some other suitable input device. Further, input/output (I/O) unit 712 may send output to a printer. Display 714 provides a mechanism to display information to a user.

Instructions for the operating system, applications, and/or programs may be located in storage devices 716, which are in communication with processor unit 704 through communications fabric 702. In these illustrative examples, the instructions are in a functional form on persistent storage 708. These instructions may be loaded into memory 706 for execution by processor unit 704. The processes of the different embodiments may be performed by processor unit 704 using computer implemented instructions, which may be located in a memory, such as memory 706.

These instructions are referred to as program code, computer usable program code, or computer readable program code that may be read and executed by a processor in processor unit 704. The program code in the different embodiments may be embodied on different physical or computer readable storage media, such as memory 706 or persistent storage 708.

Program code 718 is located in a functional form on computer readable media 720 that is selectively removable and may be loaded onto or transferred to data processing system 700 for execution by processor unit 704. Program code 718 and computer readable media 720 form computer program product 722 in these examples. In one example, computer readable media 720 may be computer readable storage media 724 or computer readable signal media 726. Computer readable storage media 724 may include, for example, an optical or magnetic disk that is inserted or placed into a drive or other device that is part of persistent storage 708 for transfer onto a storage device, such as a hard drive, that is part of persistent storage 708. Computer readable storage media 724 also may take the form of a persistent storage, such as a hard drive, a thumb drive, or a flash memory, that is connected to data processing system 700. In some instances, computer readable storage media 724 may not be removable from data processing system 700.

Alternatively, program code 718 may be transferred to data processing system 700 using computer readable signal media 726. Computer readable signal media 726 may be, for example, a propagated data signal containing program code 718. For example, computer readable signal media 726 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 718 may be downloaded over a network to persistent storage 708 from another device or data processing system through computer readable signal media 726 for use within data processing system 700. For instance, program code stored in a computer readable storage medium in a server data processing system may be downloaded over a network from the server to data processing system 700. The data processing system providing program code 718 may be a server computer, a client computer, or some other device capable of storing and transmitting program code 718.

The different components illustrated for data processing system 700 are not meant to provide architectural limitations to the manner in which different embodiments may be implemented. The different illustrative embodiments may be implemented in a data processing system including components in addition to or in place of those illustrated for data processing system 700. Other components shown in FIG. 7 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 704 may take the form of a hardware unit that has circuits that are manufactured or configured for a particular use. This type of hardware may perform operations without needing program code to be loaded into a memory from a storage device to be configured to perform the operations.

For example, when processor unit 704 takes the form of a hardware unit, processor unit 704 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 718 may be omitted because the processes for the different embodiments are implemented in a hardware unit.

In still another illustrative example, processor unit 704 may be implemented using a combination of processors found in computers and hardware units. Processor unit 704 may have a number of hardware units and a number of processors that are configured to run program code 718. With this depicted example, some of the processes may be implemented in the number of hardware units, while other processes may be implemented in the number of processors.

As another example, a storage device in data processing system 700 is any hardware apparatus that may store data. Memory 706, persistent storage 708, and computer readable media 720 are examples of storage devices in a tangible form.

In another example, a bus system may be used to implement communications fabric 702 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 706, or a cache, such as found in an interface and memory controller hub that may be present in communications fabric 702.

The different illustrative embodiments can take the form of an entirely hardware embodiment, an entirely software embodiment, or an embodiment containing both hardware and software elements. Some embodiments are implemented in software, which includes but is not limited to forms such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non-limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer usable or computer readable medium may contain or store a computer readable or computer usable program code such that when the computer readable or computer usable program code is executed on a computer, the execution of this computer readable or computer usable program code causes the computer to transmit another computer readable or computer usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output devices can be coupled to the system either directly or through intervening Input/output controllers. These devices may include, for example, without limitation, keyboards, touch screen displays, and pointing devices.

Different communications adapters may also be coupled to the system to enable the data processing system to become coupled to other data processing systems or remote printers or storage devices through intervening private or public networks. Non-limiting examples of modems and network adapters are just a few of the currently available types of communications adapters.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

REFERENCES

1 Frederico A. C. Azevedo, Ludmila R. B. Carvalho, Lea T. Grinberg, JoséMarcelo Farfel, Renata E. L. Ferretti, Renata E. P. Leite, Wilson Jacob Filho, Roberto Lent, and Suzana Herculano-Houzel. Equal numbers of neuronal and nonneuronal cells make the human brain an isometrically scaled-up primate brain. The Journal of Comparative Neurology, 513(5):532-541, April 2009. doi:10.1002/cne.21974.

2 Grey Ballard, Austin R. Benson, Alex Druinsky, Benjamin Lipshitz, and Oded Schwartz. Improving the Numerical Stability of Fast Matrix Multiplication. SIAM Journal on Matrix Analysis and Applications, 37(4):1382-1418, January 2016. URL: http://epubs.siam.org/doi/abs/10.1137/15M1032168, doi:10.1137/15M1032168.

3 Markus Bläser. Fast Matrix Multiplication. Number 5 in Graduate Surveys. Theory of Computing Library, December 2013. URL: http://theoryofcomputing.org/articles/gs005/.

4 Steve K Esser, Rathinakumar Appuswamy, Paul Merolla, John V Arthur, and Dharmendra S Modha. Backpropagation for energy-efficient neuromorphic computing. In Advances in Neural Information Processing Systems, pages 1117-1125, 2015.

5 Merrick Furst, James B. Saxe, and Michael Sipser. Parity, circuits, and the polynomialtime hierarchy. Mathematical systems theory, 17(1):13-27, December 1984. URL: http://link.springer.com/article/10.1007/BF01744431, doi:10.1007/BF01744431.

6 Wulfram Gerstner and Werner Kistler. Spiking Neuron Models: Single Neurons, Populations, Plasticity. Cambridge University Press, 2002.

7 Giacomo Indiveri, Bernabe Linares-Barranco, Tara Julia Hamilton, André van Schaik, Ralph Etienne-Cummings, Tobi Delbruck, Shih-Chii Liu, Piotr Dudek, Philipp Häfliger, Sylvie Renaud, Johannes Schemmel, Gert Cauwenberghs, John Arthur, Kai Hynna, Fopefolu Folowosele, Sylvain Saïghi, Teresa Serrano-Gotarredona, Jayawan Wijekoon, Yingxue Wang, and Kwabena Boahen. Neuromorphic silicon neuron circuits. Frontiers in Neuroscience, 5(73), 2011. URL: http://www.frontiers-in.org/neuromorphic_engineering/10.3389/fnins.2011.00073/abstract,doi:10.3389/fnins.2011.00073.

8 Daniel M. Kane and Ryan Williams. Super-Linear Gate and Super-Quadratic Wire Lower Bounds for Depth-Two and Depth-Three Threshold Circuits. arXiv:1511.07860 [cs], November 2015. arXiv: 1511.07860. URL: http://arxiv.org/abs/1511.07860.

9 Muhammad Mukaram Khan, David R Lester, Luis A Plana, A Rast, Xin Jin, Eustace Painkras, and Stephen B Furber. SpiNNaker: mapping neural networks onto a massively-parallel chip multiprocessor. In Neural Networks, 2008. IJCNN 2008. (IEEE World Congress on Computational Intelligence). IEEE International Joint Conference on, pages 2849-2856. IEEE, 2008.

10 Francois Le Gall. Powers of Tensors and Fast Matrix Multiplication. In Proceedings of the 39th International Symposium on Symbolic and Algebraic Computation, ISSAC '14, pages 296-303, New York, N.Y., USA, 2014. ACM. URL: http://doi.acm.org/10.1145/2608628.2608664, doi:10.1145/2608628.2608664.

11 Warren S. McCulloch and Walter Pitts. A logical calculus of the ideas immanent in nervous activity. The bulletin of mathematical biophysics, 5(4):115-133, December 1943. URL: http://link.springer.com/article/10.1007/BF02478259, doi:10.1007/BF02478259.

12 Paul A Merolla, John V Arthur, Rodrigo Alvarez-Icaza, Andrew S Cassidy, Jun Sawada, Filipp Akopyan, Bryan L Jackson, Nabil Imam, Chen Guo, Yutaka Nakamura, et al. A million spiking-neuron integrated circuit with a scalable communication network and interface. Science, 345 (6197):668-673, 2014. 13 Robert C. Minnick. Linear-input logic. IRE Trans. Electronic Computers, 10(1):6-16, 1961. URL: http://dx.doi.org/10.1109/TEC.1961.5219146, doi:10.1109/TEC.1961.5219146.

14 Saburo Muroga. The principle of majority decision logical elements and the complexity of their circuits. In IFIP Congress, pages 400-406, 1959.

15 Günce Keziban Orman, Vincent Labatut, and Hocine Cherifi. An empirical study of the relation between community structure and transivity. Studies in Computational Intelligence, 424:99-110, 2013.

16 C Seshadhri, Tamara G. Kolda, and Ali Pinar. Community structure and scale-free collections of erdos-renyi graphs. Physical Review E, 85(056109), 2012.

17 Jiri Šíma and Pekka Orponen. General-Purpose Computation with Neural Networks: A Survey of Complexity Theoretic Results. Neural Computation, 15(12):2727-2778, December 2003. URL: http://dx.doi.org/10.1162/089976603322518731, doi:10.1162/089976603322518731.

18 K. Y. Siu and J. Bruck. Neural computation of arithmetic functions. Proceedings of the IEEE, 78(10):1669-1675, October 1990. doi:10.1109/5.58350.

19 Kai-Yeung Siu and Vwani Roychowdhury. On Optimal Depth Threshold Circuits for Multiplication and Related Problems. SIAM Journal on Discrete Mathematics, 7(2): 284-292, May 1994. URL: http://epubs.siam.org/doi/abs/10.1137/S0895480192228619, doi:10.1137/S0895480192228619.

20 Kai-Yeung Siu, Vwani Roychowdhury, and Thomas Kailath. Depth-size tradeoffs for neural computation. IEEE Transactions on Computers, 40(12):1402-1412, December 1991. doi: 10.1109/12.106225.

21 Kai-Yeung Siu, Vwani Roychowdhury, and Thomas Kailath. Discrete Neural Computation: A Theoretical Foundation. Prentice-Hall, Inc., Upper Saddle River, N.J., USA, 1995.

22 Kai-Yeung Siu, Vwani Roychowdhury, and Thomas Kailath. Toward Massively Parallel Design of Multipliers. Journal of Parallel and Distributed Computing, 24(1):86-93, January 1995. URL: http://www.sciencedirect.com/science/article/pii/S07437315857100 88, doi:10.1006/jpdc.1995.1008.

23 Volker Strassen. Gaussian elimination is not optimal. Numerische Mathematik, 13(4):354-356, August 1969.

24 Pete Warden. Why GEMM is at the heart of deep learning. https://petewarden.com/2015/04/20/why-gemm-is-at-the-heart-of-deep-learning/, 2015. online, accessed Feb. 9, 2017.

25 Andrew C. C. Yao. Separating the polynomial-time hierarchy by oracles. In, 26th Annual Symposium on Foundations of Computer Science, 1985, pages 1-10, October 1985. doi:10.1109/SFCS.1985.49.

What is claimed is:

1. A method of increasing an efficiency at which a plurality of threshold gates arranged as neuromorphic hardware is able to perform a linear algebraic calculation having a dominant size of N, the method comprising:
using the plurality of threshold gates to perform the linear algebraic calculation in a manner that is simultaneously efficient and at a near constant depth, wherein "efficient" is defined as a calculation algorithm that uses fewer of the plurality of threshold gates than a naïve algorithm, wherein the naïve algorithm is a straightforward algorithm for solving the linear algebraic calculation, wherein "constant depth" is defined as an algorithm that has an execution time that is independent of a size of an input to the linear algebraic calculation, and wherein the near constant depth comprises a computing depth equal to or between $O(\log(\log(N)))$ and the constant depth.

2. The method of claim 1 wherein the linear algebraic calculation comprises matrix multiplication of two square matrices of size N×N.

3. The method of claim 2 wherein the calculation algorithm has a first number of operations of $O(N^{2+\delta})$ compared to the straightforward algorithm having a second number of operations of $O(N^3)$, wherein $\delta$ comprises a number that is greater than or equal to zero but less than one.

4. The method of claim 3 further comprising:
converting an initial depth of the linear algebraic calculation, wherein the initial depth is $\log_2 N$, to the near constant depth.

5. The method of claim 4 wherein the near constant depth is the constant depth, and wherein converting comprises:
setting the constant depth to a value of at most 2d+5 that determines whether trace $(A^3) \geq \tau$ using $\tilde{O}(dN^{\omega+c\gamma^d})$ of the plurality of threshold gates, where c>0 and γ<1 are constants with respect to N and d that depend on parameters of the calculation algorithm, wherein d is a constant, and wherein ω is between exactly 2 and less than 3.

6. The method of claim 4 further comprising:
dedicating a sub-plurality of the plurality of threshold gates to communicate non-binary numbers that require increasing precision to define during subsequent stages of the calculation algorithm.

7. The method of claim 1 wherein the linear algebraic calculation comprises a matrix inversion.

8. The method of claim 1 wherein the linear algebraic calculation comprises multiplying at least two matrices in order to count triangles in a graph G.

9. A neuromorphic computer comprising:
a plurality of threshold gates or spiking neurons configured to compute a specific linear algebraic calculation having a dominant size of N in a manner that is simultaneously efficient and at a near constant depth, wherein "efficient" is defined as a calculation algorithm that uses fewer of the plurality of threshold gates than a naïve algorithm, wherein the naïve algorithm is a straightforward algorithm for solving the specific linear algebraic calculation, wherein "constant depth" is defined as an algorithm that has an execution time that is independent of a size of an input to the specific linear algebraic calculation, and wherein the near constant depth comprises a computing depth equal to or between $O(\log(\log(N)))$ and the constant depth.

10. The neuromorphic computer of claim 9 wherein the specific linear algebraic calculation comprises matrix multiplication of two square matrices of size N×N.

11. The neuromorphic computer of claim 10 wherein the calculation algorithm has a first number of operations of $O(N^{2+\delta})$ compared to the straightforward algorithm having a second number of operations of $O(N^3)$, wherein δ comprises a number that is greater than or equal to zero but less than one.

12. The neuromorphic computer of claim 11 wherein the plurality of threshold gates or spiking neurons are further configured to convert an initial depth of the specific linear algebraic calculation to the near constant depth, wherein the initial depth is $\log_2 N$.

13. The neuromorphic computer of claim 12 wherein the near constant depth is the constant depth, and wherein in being configured to convert, the plurality of threshold gates or spiking neurons are further configured to set the constant depth to a value of at most 2d+5 that determines whether trace $(A^3) \geq \tau$ using $\tilde{O}(dN^{\omega+c\gamma^d})$ of the plurality of threshold gates or spiking neurons, where c>0 and γ≤1 are constants with respect to N and d that depend on parameters of the calculation algorithm, wherein d is a constant, and wherein ω is between exactly 2 and less than 3.

14. The neuromorphic computer of claim 12 wherein a sub-plurality of the plurality of threshold gates or spiking neurons are dedicated to communicate non-binary numbers that require increasing precision to define during subsequent stages of the calculation algorithm.

15. The neuromorphic computer of claim 9 wherein the specific linear algebraic calculation comprises a matrix inversion.

16. The neuromorphic computer of claim 9 wherein the specific linear algebraic calculation comprises multiplying at least two matrices in order to count triangles in a graph G.

17. A method of manufacturing a neuromorphic computer tailored to perform a specific linear algebraic calculation, the method comprising:
manufacturing a plurality of threshold gates or spiking neurons; and
arranging the plurality of threshold gates or spiking neurons to compute the linear algebraic calculation having a dominant size N in a manner that is simultaneously efficient and at a near constant depth, wherein "efficient" is defined as a calculation algorithm that uses fewer of the plurality of threshold gates than a naïve algorithm, wherein the naïve algorithm is a straightforward algorithm for solving the linear algebraic calculation, wherein "constant depth" is defined as an algorithm that has an execution time that is independent of a size of an input to the linear algebraic calculation, and wherein the near constant depth comprises a computing depth equal to or between $O(\log(\log(N)))$ and the constant depth.

18. The method of claim 17 wherein the specific linear algebraic calculation comprises matrix multiplication of two square matrices of size N×N.

19. The method of claim 18 further comprising:
further arranging the plurality of threshold gates or spiking neurons to convert an initial depth of the specific linear algebraic calculation to the near constant depth, wherein the initial depth is $\log_2 N$.

20. The method of claim 19 further comprising:
further arranging the plurality of threshold gates or spiking neurons to dedicate a sub-plurality of the plurality of threshold gates or spiking neurons to communicate non-binary numbers that require increasing precision to define during subsequent stages of the calculation algorithm.

\* \* \* \* \*